(12) United States Patent
Farrugia

(10) Patent No.: US 9,678,451 B2
(45) Date of Patent: Jun. 13, 2017

(54) EMULSION AGGREGATION TONER FOR SENSOR AND ANTIBACTERIAL APPLICATIONS

(71) Applicant: XEROX CORPORATION, Norwalk, CT (US)

(72) Inventor: Valerie M. Farrugia, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 133 days.

(21) Appl. No.: 14/028,840

(22) Filed: Sep. 17, 2013

(65) Prior Publication Data
US 2015/0079504 A1 Mar. 19, 2015

(51) Int. Cl.
*G03G 9/093* (2006.01)

(52) U.S. Cl.
CPC ..... *G03G 9/09392* (2013.01); *G03G 9/09328* (2013.01); *G03G 9/09342* (2013.01); *G03G 9/09371* (2013.01)

(58) Field of Classification Search
CPC .......... G03G 9/09342; G03G 9/09371; G03G 9/09708; G03G 9/09328
USPC .......................................... 430/110.2, 108.1
See application file for complete search history.

(56) References Cited

U.S. PATENT DOCUMENTS

| | | | |
|---|---|---|---|
| 7,419,753 B2 * | 9/2008 | Vanbesien et al. | 430/109.3 |
| 7,575,841 B2 * | 8/2009 | Daimon et al. | 430/109.4 |
| 8,084,180 B2 * | 12/2011 | Zhou | G03G 9/0819 430/109.4 |
| 8,137,879 B2 | 3/2012 | Veregin et al. | |
| 2005/0048388 A1 * | 3/2005 | Lee et al. | 430/108.1 |
| 2007/0111128 A1 * | 5/2007 | Patel | G03G 9/0806 430/108.4 |
| 2008/0003512 A1 * | 1/2008 | Kobayashi | G03G 9/0819 430/48 |
| 2010/0055598 A1 * | 3/2010 | Zhou | G03G 9/0804 430/109.31 |
| 2010/0086867 A1 | 4/2010 | Iftime et al. | |
| 2011/0183252 A1 * | 7/2011 | Pang | G03G 9/0819 430/109.4 |
| 2011/0200927 A1 | 8/2011 | Jung et al. | |
| 2011/0311909 A1 * | 12/2011 | Vanbesien | G03G 9/0804 430/108.1 |
| 2012/0202148 A1 | 8/2012 | Veregin et al. | |

FOREIGN PATENT DOCUMENTS

JP 2003-241423 A * 8/2003
KR 2010-0072711 A * 7/2010

OTHER PUBLICATIONS

European Patent Office Espacenet machine-assisted English-language translation of JP 2003-241423 (pub. Aug. 2003).*
European Patent Office Espacenet machine-assisted English-language translation of KR 2010-0072711 (pub. Jul. 2010).*
Georgios A. Sotiriou et al., "Engineering nanosilver as an antibacterial, biosensor and bioimaging material", Curr Opin Chem Eng, vol. 1, No. 1, Oct. 2011, pp. 1-12.
Aoife Power et al., "Silver Nanoparticle Polymer Composite Based Humidity Sensor", Analyst, vol. 135, 2010, pp. 1645-1652.
Stephen T. Dubas et al., "Green synthesis of silver nanoparticles for ammonia sensing", Talanta, vol. 76, 2008, pp. 29-33.
Sadanand Pandey et al., "Green synthesis of biopolymer-silver nanoparticle nanocomposite: An optical sensor for ammonia detection", International Journal of Biological Macromolecules, vol. 51, 2012, pp. 583-589.
A Serra et al., "Non-functionalized silver nanoparticles for a localized surface plasmon resonance-based glucose sensor", Nanotechnology, vol. 20, 2009, pp. 1-7.
Roger J. McNichols et al., "Optical glucose sensing in biological fluids: an overview", Journal of Biomedical Optics, vol. 5, No. 1, Jan. 2000, pp. 5-16.
Cheanyeh Cheng et al., "Biosensor with Nano-gold Particle Modified Pencil Lead Carbon Electrode for Long-term Glucose Monitoring of Waste Tree Branch Hydrolysis", Journal of Chinese Chemical Society, vol. 58, 2011, pp. 739-748.
M. F. Mabrook et al., "An inkjet-printed chemical fuse", Applied Physics Letters, vol. 86, 013507, 2005, pp. 1-3.
Koji Abe et al., "Inkjet-Printed Microfluidic Multianalyte Chemical Sensing Paper", Anal. Chem., vol. 80, 2008, pp. 6928-6934.
Karl Crowley et al., "An aqueous ammonia sensor based on an inkjet-printed polyaniline nanoparticle-modified electrode", Analyst, vol. 133, 2008, pp. 391-399.

* cited by examiner

Primary Examiner — Janis L Dote
(74) Attorney, Agent, or Firm — MH2 Technology Law Group LLP

(57) ABSTRACT

Provided is a toner that has a plurality of toner particles. Each toner particle can include a binder resin core and a shell disposed about the binder resin core. The binder resin core can include at least one binder resin. The shell can include a plurality of metal nanoparticles. The binder resin core can be prepared by forming an aggregate of the binder resin in which metallic nanoparticles are not present.

9 Claims, 8 Drawing Sheets

EMULSION AGGREGATION TONER FOR SENSOR AND ANTIBACTERIAL APPLICATIONS

FIELD OF THE INVENTION

The subject matter disclosed in this application relates generally to the field of toner compositions containing metal nanoparticles and methods of making such toner compositions. More specifically, the subject matter discloses core-shell toner compositions containing metal nanoparticles that can be used on various substrates that require antimicrobial, antiviral and antifungal properties.

BACKGROUND OF THE INVENTION

Silver compounds have historically been used as antibacterial agents. In ancient Greece and Rome, silver coins were used to preserve water. In the 19th century silver nitrate was used to treat a variety of ailments, from typhoid to post-partum infections. Today a variety of applications utilize silver-containing materials including Ag-coated medical devices, dressings for chronic wounds and burns, cosmetics, food preservation and water treatment.

More recently, silver (Ag) nanoparticles have been used in many applications due to their antimicrobial, antiviral and antifungal properties. For example, silver-containing compounds incorporated in or on the surfaces of a vast range of medical devices, such as vascular, urinary, and peritoneal catheters, endotracheal tubes, sutures, and fracture fixation devices. Additionally, silver nanoparticles can be utilized in diagnostic instruments/sensors. For example, as shown in FIG. 1A, a known plasmonic biosensor 100 can include silver nanoparticles 103 formed over a glass substrate 102.

A corresponding characteristic Plasmon extinction spectrum 101 is shown in FIG. 1B. As shown for biosensor 100', the silver nanoparticles 103 can be biofunctionalized with a biomolecule 105. A higher refractive index of the biomolecule than a surrounding buffer solution can force a red-shift in the Ag spectrum 101' as shown in FIG. 1B. When a ligand analyte 107, for example, an amino acid such as cysteine, a tripeptide such as glutathione and selective monoclonal antibodies, binds on the functionalized nanosilver surface 105, the spectrum is further redshifted by $\Delta\lambda$ as shown at 101'' in FIG. 1B. In other words, a biosensor response, can be triggered via a shift in wavelength upon selective binding of ligands to biomolecules functionalized onto the silver nanoparticles surface. It would be beneficial to provide a method for delivering metal nanoparticles onto substrates that form components of such medical devices.

Silver nanoparticles are also used in non-medical materials as well such as plastics (e.g., kitchen appliances) and fabrics (e.g., yoga clothing manufacturer Lululemon's SILVERESCENT LUON®). While not limited to any particular theory, it is believed that antibacterial mechanism of silver is includes (i) inactivation of proteins, enzymes and DNA by silver (Ag) attachment to groups containing sulfur or phosphorus, (ii) cell membrane and mitochondria damage, (iii) inhibition of respiratory processes, and (iv) generation of reactive oxygen molecules and free radicals.

Meanwhile, nanoparticles of various forms, shapes and properties have been incorporated with toners, such as electrophotographic toners, in order to provide a carrying mechanism for delivery onto substrates. The methods of making such toners must balance the process of making the toner particles in order to preserve their desirable characteristics with additional processes for incorporating the nanoparticles with the toner particles to provide additional advantageous characteristics to the final application. For example, U.S. Pat. No. 8,137,879, which is hereby incorporated in its entirety herein, discloses a toner that includes single crystal magnetic nanoparticles for use in printing characters in Magnetic Ink Character Recognition (MICR) technology.

Among the major factors affecting print quality in any toner based printing system are the narrowness of the toner particle size distribution, the mean particle size, particle shape, particle surface morphology and toner charge distribution. The narrowness of the toner particle size distribution has an effect on the toner charge distribution and this has an effect on the variation in performance particle to particle in the development process. Hence, the narrower the toner particle size distribution, the more consistent the toner imaging performance will be in image development. Accordingly, there exist various methods for manufacturing toner according to the desired properties thereof. For example, in emulsion polymerization, monomers are diffused into a micelle where free radical polymerization proceeds with the resulting formation of polymer particles. In suspension polymerization, mechanical forces in mixing during polymerization dominate toner particle formation and hence particle size and distribution.

Some of the manufacturing methods are limited. For example, in emulsion polymerization toner manufacture, other necessary components of toner pigment, charge control agent, wax, etc. cannot be internalized into the polymer particles because such materials cannot diffuse into the micelle. However, if toner particle formation is attempted by direct combination of these components at the emulsion polymerization step, then they will reside on the polymer particle surface where they will affect the dispersion stability of the emulsion polymerization and cause erratic coagulation.

Accordingly, the process of preparing microspheres that enable control of well-defined particle characteristics such as size, size distribution and functionality are becoming increasingly important for a variety of applications. However, either the particle size range that is achievable or the types of materials that can be utilized in the process limit some of the current methods of microsphere preparation. The development of new methods for the preparation of microspheres that broaden the design space would therefore be an asset.

Emulsion aggregation ("EA") processes provide for the preparation of micron-sized polymeric microspheres with narrow particle size distribution. With EA, it is possible to achieve a better Geometric Size Distrubition (GSD) than conventionally prepared toner which is significant in terms of imaging performance. The narrowness of particle size distribution, combined with the evenness of shape and homogeneity of emulsion/aggregation toners helps to create a narrow charge distribution. Additionally, small mean particle size toners tend to be more expensive to produce than larger ones when using conventional toner preparation methods. This cost progression tends to be geometric with the reduction in particle size in attrition grinding and conventional classification. However, in emulsion/aggregation manufacturing, there is essentially no relationship between mean particle size and cost. Thus, under the right conditions, there is the potential for an EA toner to provide better print quality and be more competitive in cost than a conventional toner.

In addition, the enablement of small mean particle size leads to the possibility of reduction in developed toner mass per unit area. This means that the amount of toner used per page is able to be decreased with consequent cost savings in total cost of ownership per page.

The shape of the toner also affects the toner flowability, charging and adhesion force. The combination of improvements in these attributes determines important performance factors such as transfer efficiency, developability and photoconductor surface cleanability. There are a few methods proposed for the determination and metrication of shape. One such method is to describe the "Shape Factor." The shape factor of a toner particle is measured by comparing the square of the maximum length of a particle (ML) to the maximum projected area (A). The formula for shape factor is:

$$\text{Shape Factor (SF)} = ((ML)^2/A) \times (\pi/4) \times 100$$

Thus with highly rounded toners the shape factor is close to 100. With such toners it is possible to achieve very high transfer efficiency rates, in excess of 99%. The adhesion force between a toner and surfaces in the engine, such as photoconductor and intermediate transfer belt, is minimized by the uniform shape and surface of the toner. These properties not only lower adhesion force but also help to create uniform charging properties particle to particle. High levels of transfer efficiency mean that the consumption of toner and level of waste can be minimized. This type of performance translates into high yield and helps to lower the toner element in the cost of printing. However, residual toner after transfer with shape factors of 100 that remains on the photoconductor surface is more difficult to clean using the common blade cleaning technique. In practice the toner manufacturer is able to optimize the toner shape with emulsion/aggregation according to the application.

In broad terms, the EA process accomplishes the manufacturing of toners having desirable results by allowing for the controlled growth of microspheres from nanometer size constituents, such as polymer and pigments, through careful control of chemical and physical conditions to affect particle size, shape and size distribution. Additionally, a variety of resin types can be used in this process and other materials such as pigments can be incorporated into the particles. Thus EA provides advantages over mere emulsion polymerization toner manufacture and suspension polymerization. That is, in EA, the pigmentation and polymerization steps can be separated. Accordingly, there is no interference by the other toner ingredients with the polymerization process. Additionally, the ability to adjust and finely control the chemistry of the polymer and the other materials in the toner particle formation step in emulsion aggregation permits the particle size and particle size distribution to be more controllable.

The Emulsion/Aggregation process begins with the preparation of nanometer sized polymer particles stabilized in water using various techniques. These particles can be on the order of 10 to 300 nm in size. A variety of resin types can be used, including styrene-based materials, acrylates, polyesters, etc. A second step involves the growth of the nanometer-sized particles by mixing in deionized water in the presence of an aggregating agent. It is at this stage that other ingredients can be incorporated into the particle by adding them as water based dispersions. All of the components are homogenized to ensure effective mixing and continuous mixing is utilized throughout the growth process. Once the desired particle size is reached, the growth process can be terminated. Depending on the resin type utilized, the particles generated at this stage are either already spherical or require further treatment to coalesce into spheres. Once the microspheres are formed they can be isolated from the water and washed to remove the various ions and surfactants used in the process.

The EA process enables control of particle size and size distribution. As particles grow, the particles size increases with time. It is also during this phase that the particle size distribution narrows. A narrow particle size distribution is achieved using the EA process and a typical size distribution curve. The geometric standard deviation based on volume is less than 1.25. The ability to obtain narrow particles size distributions is driven by the growth kinetics and balance between the forces binding the particles together and the shear forces that erode aggregated particles. The growth process proceeds from individual particles, to a gel network, to individual aggregates that continue to grow with time.

The particles produced in this process can vary in shape depending on process conditions. For the styrene-based toner particle case, the conditions can be adjusted such that a non-spherical or completely spherical particle is obtained. The EA process is particularly suited to the incorporation of nanometer-sized pigments. This has been demonstrated in the application to toner materials for electrophotographic applications. Dispersions of pigments in water are mixed with the emulsified resin and the process is carried out in the same manner. Cross sections of particles that contain pigment show that the pigment is fairly evenly distributed throughout the particle. It is possible to add additional latex to cover surface pigment.

An EA process is summarized in a flowchart illustrated in FIG. 2. As a preliminary step in forming primary resin particles, a monomer mixture is formed 201 by blending a monomer such as that of styrene with an acrylic ester and acrylic acid 202 in a low speed mixer for an appropriate amount of time to ensure homogeneity. An aqueous medium phase containing other polymerization ingredients is also prepared 202 in a mixer and can contain, for example, hot deionized water with an anionic surfactant, initiator and chain transfer agent. In the manufacture of a latex via polymerization 203, an emulsion is formed by mixing the two phases from 201 and 202 at elevated temperature in a low intensity mixer for a predetermined number of hours. In this process "primary particles" are formed. These can be in the form of a latex of non-pigmented emulsion polymerized particles between 0.1-0.3 microns.

The process continues with preparation of a pigment dispersion and other components formed in an aqueous medium at 204. That is, a pigment in deionized water can be prepared with small amounts of a dispersing aid and an anionic surfactant. In addition to or alternatively, a wax component can be dispersed therein by high shear mixing and applied heating of this material in deionized water with small amounts of dispersing aid and anionic surfactant.

The mixture of primary particles in their aqueous medium can then be transferred to a high-speed jacketed mixer and the dispersions colorant and wax and a charge control agent (CCA) can be added at 205. A metal compound coagulant can also be added to the mixture. The mixture can then be cooled and then dispersed for a further predetermined amount of time. Secondary particles are formed by the agglomeration of the solids in the aqueous medium containing primary particles, the pigment, wax and CCA. The particle size at this stage of production can be about 1.0-4.0 microns, typically about 2.5 microns.

During a coalescence step 206, enlargement of the toner particle aggregation formed in step 205 can be accomplished via, for example, further stirring at elevated temperature for a predetermined number of hours. The homogenized mixture can be heated with continuous mixing in the reactor and with gradual ramping up of the temperature until it reaches about 90° C. where it is then further mixed and held at this temperature for about 4 hours. The secondary particles continue to grow under these conditions. The process of toner particle formation is complete at this point. However, if the toner is to be encapsulated when, for example, the toner particles are slightly smaller than the desired finished size, a shell-forming latex solution formed in 205' can optionally (as indicated by the dashed line) be added to the aggregation formed in 205. When the particles reach the desired size, the pH of this aqueous mixture is adjusted to stop the process.

Shape adjustment (not shown) can optionally be conducted at this stage by adjustment of the temperature and other conditions. Increasing the temperature to above the $T_g$, for example, controls the viscosity of the heated polymer and allows interfacial interactions and surface tension to be used to change the particle shape. The particle shape may be changed from irregular to spherical by altering the conditions and stopping the process when the desired shape is achieved.

The mix can then be filtered, washed, and dried at step 207 to yield a "pre-toner". Methods of washing and drying a re-slurry are known and applicable in this conventional EA method. Generally, these are predominantly batch processes with a re-slurry step after each wash and used of copious amounts of deionized water. After drying, surface additives such as fumed silicas are blended in 208 to provide additional flow and charge characteristics to the toner.

Through an EA processes such as that which is disclosed in U.S. Patent Application Publication No. 2011/0200927 (which is hereby incorporated in its entirety herein), an electrophotographic toner comprising spherical metal nanoparticles has been provided. In other EA processes such as those disclosed in U.S. Patent Application Publications Nos. 2012/0202148 and 2010/0086867 (which are hereby incorporated in their entirety herein), toner particles having a core-shell structure have been provided. However, such methods are limited because they do not provide for carrier toner particles that allow for delivery of metal nanoparticles onto a substrate such that the metal nanoparticles are localized on a surface when delivered onto a substrate.

What is needed in the art, is a toner particle that can provide antimicrobial, antiviral and antifungal properties, a method of making the same, and print articles that include such toner particles.

SUMMARY

In an embodiment, there is a toner that can have a plurality of toner particles. Each toner particle can include a binder resin core and a shell disposed about the binder resin core. The binder resin core can include at least one binder resin. The shell can include a plurality of metal nanoparticles. The binder resin core can be prepared by forming an aggregate of the binder resin in which metallic nanoparticles are not present.

In another embodiment there is a print that includes a substrate and a toner disposed on a surface of the substrate. The toner can have a plurality of toner particles. Each toner particle can include a binder resin core and a shell disposed about the binder resin core. The binder resin core can include at least one binder resin. The shell can include a plurality of metal nanoparticles. The binder resin core can be prepared by forming an aggregate of the binder resin in which metallic nanoparticles are not present.

In yet another embodiment, there is a method of forming toner particles in which a first emulsified solution can be provided. The first emulsified solution can include an unsaturated amorphous resin and/or a crystalline polyester resin. A coagulant can be added to the first emulsified solution thereby forming a coagulated solution. The coagulated solution can be homogenized, thereby forming an aggregate mixture that includes aggregated particles, and no metal nanoparticles are disposed in the aggregated particles of the aggregate mixture. The aggregate mixture can be heated until the aggregated particles reach a predetermined size. A metal-containing solution can be added to the aggregate mixture, thereby forming a shell-forming mixture. The metal-containing solution can include metal nanoparticles. A pH of the shell-forming mixture can be adjusted to between about 5 and about 9, and the shell-forming mixture can be heated to a coalescing temperature, thereby producing the toner particles. The toner particles can include a binder resin core and a shell disposed about the binder resin core. The shell can include a plurality of the metal nanoparticles.

Advantages of at least one embodiment include silver-containing toner that can be used for delivery of silver nanoparticles onto surfaces, such as surfaces of devices used in diagnostic applications, e.g., printable biosensors and biological tags, antibacterial applications such as for printing on apparel or other substrates requiring antibacterial properties, conductive applications such as for enhancing thermal and electrical conductivity of toner, and optical applications such as for printing on substrates for efficient harvesting of light, metal-enhanced fluorescence (MEF) and surface-enhanced Raman scattering.

An advantage of at least one embodiment includes overcoming technical issues related to solvent casting, which involves manual application of material using microscopy and leads to reproducibility issues due to the tedious nature of manually controlling shape and thickness of deposited material. For example, in applications such as forming polymeric membranes to solid-state sensors, an advantage of at least one embodiment includes a xerography/EA toner for deposition of chemical sensors that allows for mass production leading to cost-effective sensor arrays for use in industrial, environmental and medical industries. An advantage of an embodiment is that use of Ag nanoparticles-containing toner can overcome a drawback of using a traditional electrophotographic/laser printer in that an Ag nanoparticles-containing toner can be deposited via non-contact methods onto a substrate in a way that reduces contamination and substrate damage. For example, the Ag-containing toner of embodiments described herein can be selectively deposited via contactless printing according to interactions with an electronic microchip used for generating a particular pattern, for example, via a consecutively generated electric field. After the completed deposition of a particle layer, a deposited layer can be melted with heat or ultraviolet (UV) light.

Another advantage of the embodiments is a core/shell toner particle structure having a shell that includes metal nanoparticles. Such core/shell toner particles with metal nanoparticles, such as silver nanoparticles, in the shell portion allow for proper attachment of receptors in solution and/or prior to fusing of the toner particles onto a substrate. Such core/shell toner particles with metal nanoparticles, such as silver nanoparticles, in the shell portion allow for delivery of silver nanoparticles onto substrates with surface localization that allows for receptor/target interaction.

For example, the core/shell toner particles can have silver nanoparticles disposed in the shell, no metal nanoparticles disposed in the core, and can be delivered onto a substrate. Relative to the shell, the core can have a lower glass transition temperature (Tg), less or no crosslinker, lower molecular weight, and/or lower viscosity which allows for increased spreading on a substrate and penetration into the substrate, as compared to conventional core/shell toner particles. The addition of silver nanoparticles to the shell of a core/shell toner particle allows for the delivery of metal nanoparticles onto a substrate, for example, in a print layer formed when the toner particles delivered onto the substrate are fused to the substrate, and in a manner that a distribution of metal nanoparticles is such that a concentration gradient is formed with a higher concentration of metal nanoparticles formed toward an upper or top surface of the print layer relative to a lower or bottom surface of the print layer.

Additional advantages of the embodiments will be set forth in part in the description which follows, and in part will be understood from the description, or may be learned by practice of the invention. The advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE EMBODIMENTS

Figure 1A:
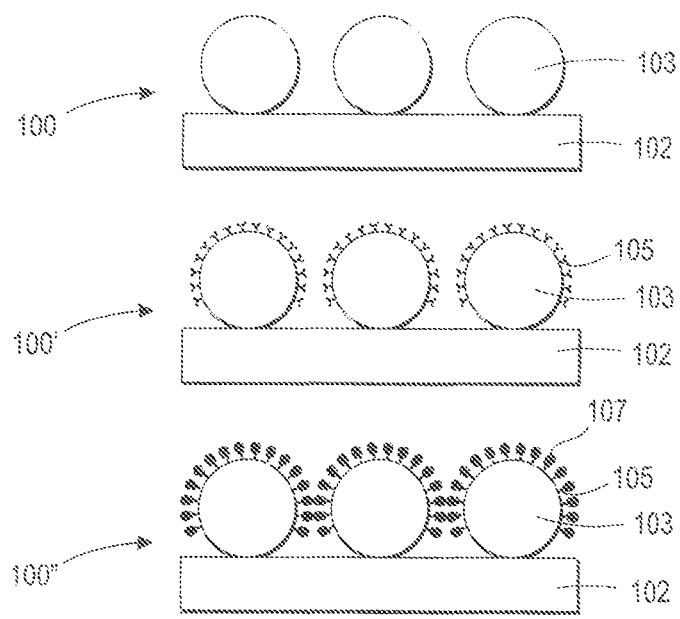
FIG. 1A illustrates a plasmonic biosensor that can include silver nanoparticles.
Figure 1B:
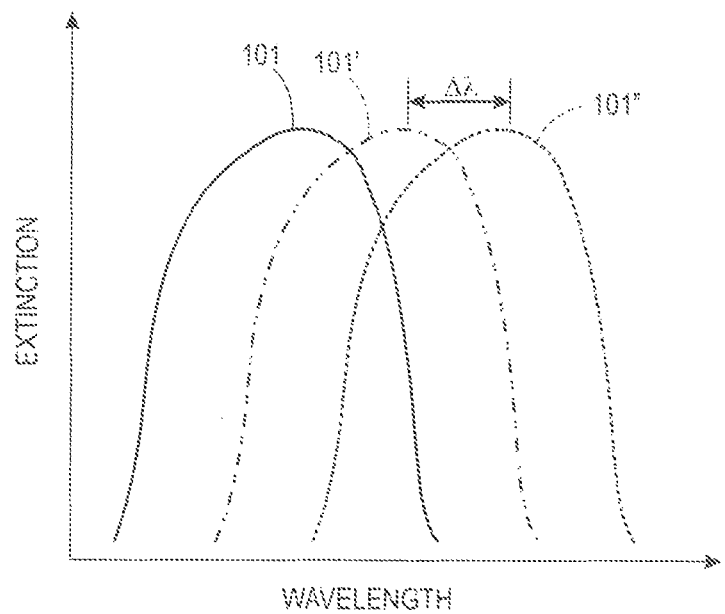
FIG. 1B shows a graphical representation of a wavelength shift representative of a biosensor response for the biosensor of FIG. 1A.
Figure 2:
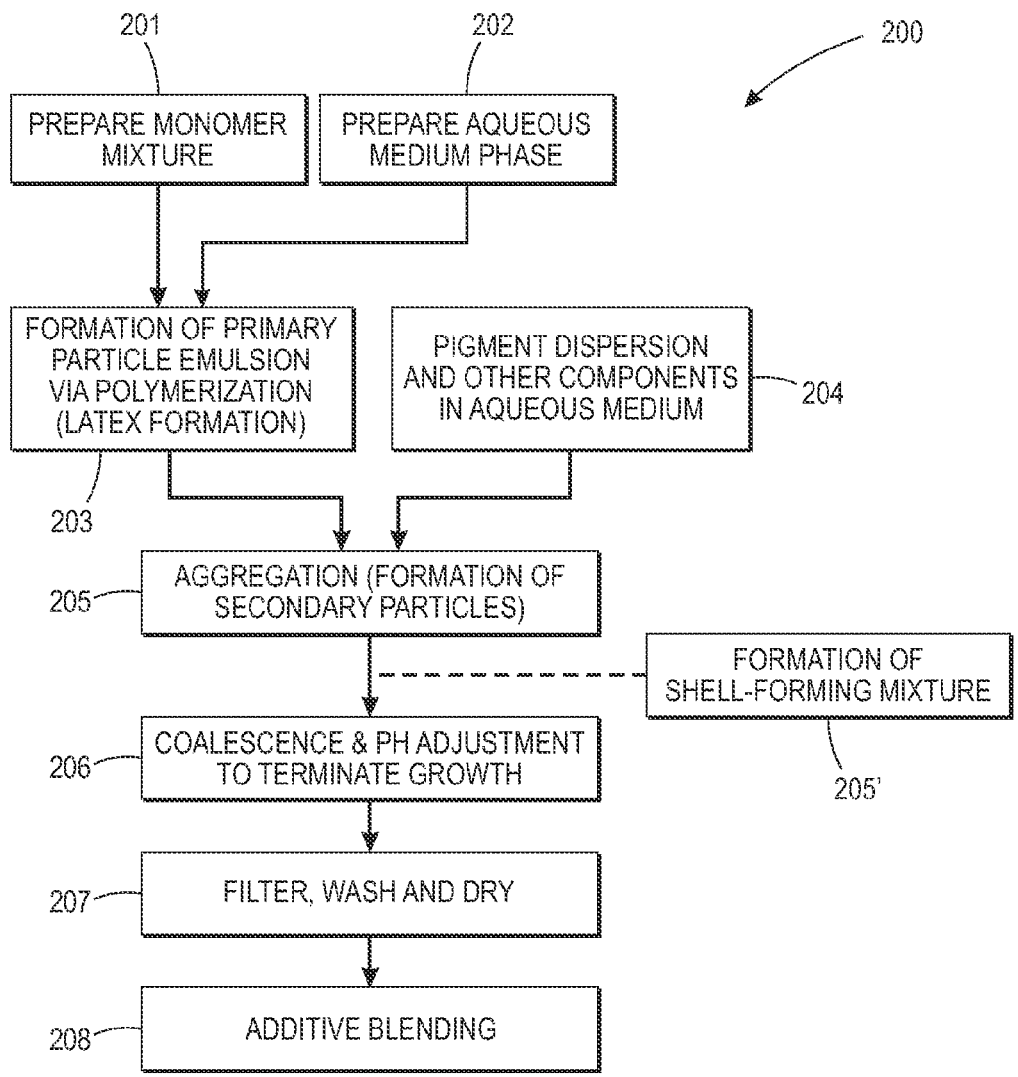
FIG. 2 summarizes a conventional emulsion/agglomeration method of forming toner particles.

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. $-1$, $-2$, $-3$, $-10$, $-20$, $-30$, etc.

The following embodiments are described for illustrative purposes only with reference to the Figures. Those of skill in the art will appreciate that the following description is exemplary in nature, and that various modifications to the parameters set forth herein could be made without departing from the scope of the present invention. It is intended that the specification and examples be considered as examples only. The various embodiments are not necessarily mutually exclusive, as some embodiments can be combined with one or more other embodiments to form new embodiments.

Embodiments described herein can utilize EA toner technology to make printable material such as a toner that includes silver nanoparticles composition for enhanced antibacterial properties. For example, such a toner that can include toner particles having a core/shell configuration (i.e., a shell formed around a core) with silver nanoparticles disposed in the shell. Upon delivering such toner particles and fusing them onto a substrate, the silver nanoparticles can be exposed to oxygen, thereby releasing silver ions which can act as powerful antimicrobials.

The silver-containing toner of embodiments described herein can be introduced as coatings for diagnostic applications (printable biosensors, biological tags), antibacterial applications (printing on apparel or other substrates requiring antibacterial properties), conductive applications (enhance thermal and electrical conductivity of toner) and optical applications (printing on substrates for efficient harvesting of light, metal-enhanced fluorescence (MEF) and surface-enhanced Raman scattering). The toner of embodiments described herein can be printed onto substrates that require the prevention of bacterial adhesion and biofilm formation. Emulsion aggregation particles with or without pigment can be formulated to contain silver nanoparticles which can be printed onto surfaces other than paper possibly labels, clothing, security-documents (paper or otherwise), plastics, and the like.

Figure 3:
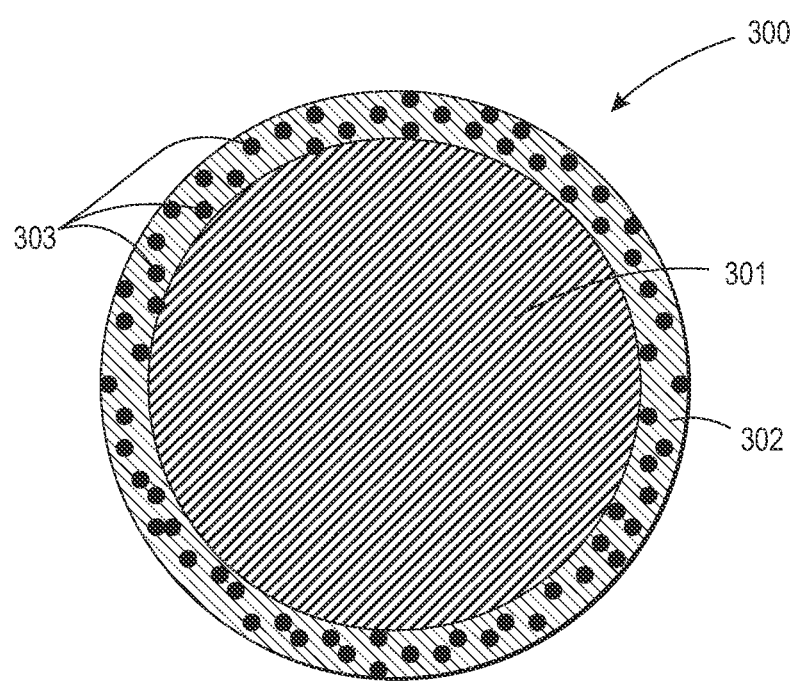
FIG. 3 shows a core-shell EA toner particle of an embodiment.

In an embodiment, a toner can include a plurality of toner particles. As shown in FIG. 3, each toner particle 300 can include a binder resin core 301 and a shell 302 disposed about the binder resin core. The binder resin core 301 can include one binder resin. The shell 302 can include a plurality of metal nanoparticles 303. For example, the shell 302 can be formed of a matrix material in which metal nanoparticles 303 are disposed. The shell can have a shell thickness of between about 0.001 μm and about 2.0 μm. In an embodiment, the toner particles can comprise between about 0.00001 wt % and about 10 wt % or between about 0.01 wt % to 10 wt % metal nanoparticles by weight of the toner particles. The binder resin core can be prepared by a method that includes forming an aggregate of the binder resin. To avoid inclusion of metal nanoparticles from being incorporated in the binder resin core, the aggregate of the binder resin should not be formed in the presence of metallic nanoparticles.

The binder resin core can further comprise at least one of an additional resin, a wax, a coagulant, and a stabilizer. In an embodiment, the binder resin core consists essentially of a binder resin and at least one of an additional resin, a wax, a coagulant, and a stabilizer. In an embodiment, the binder resin core comprises an amorphous polyester, and, optionally, a crystalline polyester.

The binder resin core 301 can be encapsulated in shell 302. In addition to the metal nanoparticles, the shell can include a matrix in which the metal nanoparticles are disposed, for example a matrix formed of a resin, such as an amorphous polyester resin. The shell can be free of crystalline polyesters. In an embodiment, the shell matrix is the same resin as the binder resin of the core. In another example, the shell matrix is formed of a resin having a higher Tg than a Tg of the core's resin.

In an embodiment each metal nanoparticle can include silver (Ag) nanoparticles. Silver nanoparticles formed in the shell portion of the toner particles can be sourced from a silver nanopowder, such as redispersible dried silver nanopowders available from NanoComposix (San Diego, Calif.) that are formulated with polymer or alkanethiol surface coatings which allow the nanoparticles to easily be redispersed as unagglomerated dispersions in a variety of solvents. Preferred silver nanopowders include nanoparticles with polyvinylpyrrolidone (PVP) surface coating of only 0.3% to 4.0% mass percent and the size of the nanopowders range from 10-100 nm with narrow distributions (coefficient of variation (CV)<15%). Organic dispersible silver nanopowders that do not agglomerate after dispersion into hexane, toluene, chloroform, and many other organic solvents can be used in the embodiments. These silver nanoparticles may be available with a size of 4 nm (CV<20%). In embodiments, other silver nanoparticles formed in the shell portion of the toner particles can be those of 10 nm, 20 nm, 40 nm, 60 nm, and 100 nm in diameter with a citrate-stabilized surface at concentrations of 0.02 mg/mL such as those available from Sigma-Aldrich (St. Louis, Mo.; Product Nos. 730785, 730777, 730793, 730807, 730815).

Silver nanoparticles can be synthesized. For example, a 100 mL DIW ice-chilled aqueous solution of $1.0 \times 10^{-3}$ M silver nitrate can be mixed with a 300 mL DIW ice-chilled aqueous solution of $2.0 \times 10^{-3}$ M sodium borohydride. On mixing both solutions, Ag ions are reduced to form mono dispersed nanoparticles as a transparent solution in aqueous medium. The reaction can described in the following equation:

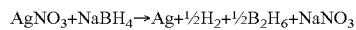

$$AgNO_3 + NaBH_4 \rightarrow Ag + \tfrac{1}{2}H_2 + \tfrac{1}{2}B_2H_6 + NaNO_3$$

The Ag solution formed is yellow in color because of the absorption at ~400 nm, which is characteristic of silver nanoparticles due to the excitation of surface plasmons. The solution can be stirred repeatedly upon color darkening (for approximately an hour) until stabilized. The Ag nanoparticles solution stabilizes and may not change color for about three months without any stabilizing agent.

Figure 4A:
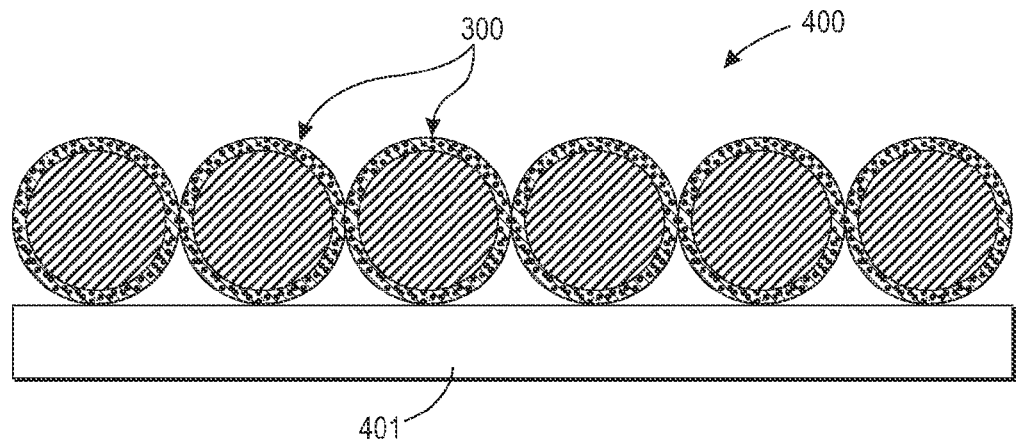
FIG. 4A illustrates a print that includes a substrate and a toner of an embodiment disposed on a surface of the substrate.

Toner can be deposited to form a print 400 as shown in FIG. 4A. A print can include a substrate 401 and a toner disposed on a surface of the substrate. The substrate can be a polymer a fabric, paper or a microchip. The print can be a component of a sensor, a detector, a textile, a toy, a label or an antimicrobial coating. As disclosed above, the toner can include a plurality of toner particles 300. Substantially all of the toner particles or each toner particle 300 can include a binder resin core 301 and a shell 302 disposed about the binder resin core. The binder resin core 301 can include at least one of a binder resin. The shell 302 can include a plurality of metal nanoparticles 303. The binder resin core can be prepared by a method that includes forming an aggregate of the binder resin. To avoid inclusion of metal nanoparticles from being incorporated in the binder resin core, the aggregate of the binder resin should not be formed in the presence of metallic nanoparticles.

Figure 4B:
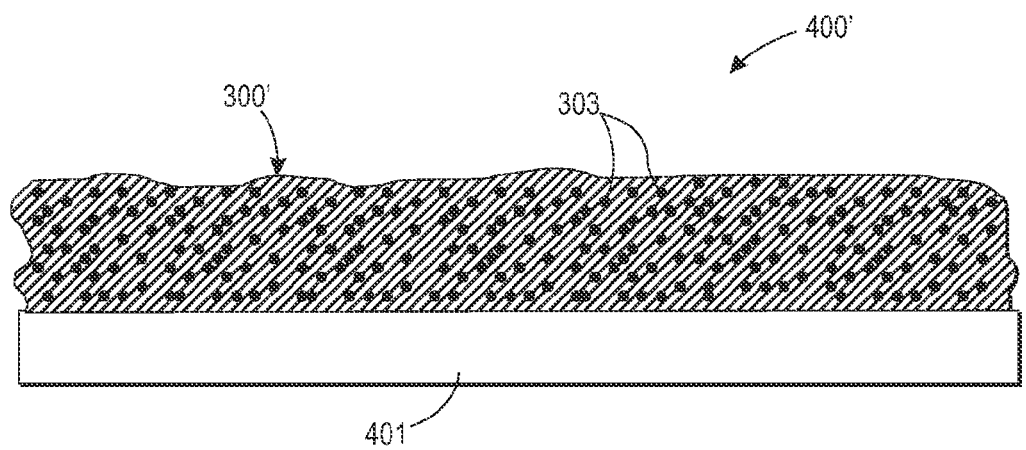
FIG. 4B illustrates a post deposition melting of the toner forming the print of FIG. 4A.

The toner comprising metal nanoparticles-containing toner particles 300 of embodiments described herein can be selectively deposited via contactless printing according to interactions with an electronic microchip used for generating a particular pattern on a substrate 401. In an example, such a deposition can occur via guiding the particles in a consecutively generated electric field. In an example as shown in FIG. 4B, after the completed deposition of a particle layer of the toner particles the deposited layer 300' can be melted with heat or ultraviolet (UV) light to form print 400' that includes metal nanoparticles 303 distributed therein.

The inclusion of silver nanoparticles 303 disposed in the shell 302 of the core shell toner particles 300 allows for the delivery of metal nanoparticles 303 onto the substrate 401, for example, in the print layer 300' formed when the toner particles 300 are delivered onto the substrate and are fused to the substrate. While FIG. 4B shows the nanoparticles distributed randomly in print layer 300', the distribution pattern is not so limited. For example, in one embodiment, a distribution gradient of metal nanoparticles concentration in the layer 300' can form. That is, in an embodiment, metal nanoparticles can be distributed within the print layer in a higher concentration at an upper or top surface of the print layer relative to a concentration of nanoparticles at a lower or bottom surface of the print layer. While not limited to any particular theory, it is believed that differences such as polymer composition, Tg, crosslinking, rheology, and other factors, between the core and the shell materials of the toner particle can affect metal nanoparticles distribution within a layer formed upon fusion of the toner particles to the substrate.

The shell of the core-shell toner particles in embodiments described herein can be formed from a metal-containing solution 805'. Such a metal-containing solution can be prepared by processes such as those illustrated in FIGS. 5-7 and described below.

Phase Inversion Method for Forming Material Utilized for Forming Shell

While not limited to any particular process, a phase inversion emulsification (PIE) process can be used for forming the metal-containing solution 805'. In such a PIE process, resin and/or other components, such as silver nanoparticles, is solubalized in an organic solvent that is immiscible with water, for example, methyl ethyl ketone or ethyl acetate, and a phase inversion organic solvent, such as isopropanol. A neutralization agent, such as ammonium hydroxide and water can then be added. The organic solvents can then be removed with heat, for example, during flashing or distillation to form the metal-containing solution.

For example, the phase inversion process disclosed herein first involves the solubilization of resin and other components in an organic solvent, which is generally immiscible with water. The ratio of resin to solvent is usually determined by solubility and resulting viscosity. It has been found that the optimal ratio of the phase inversion process disclosed herein is approximately 5 to 7 parts of organic solvent, for example, methyl ethyl ketone, per 10 parts of resin.

Other suitable ratios of solvent to resin can be used, in embodiments, as desired. Thus, for example, the ratio of solvent to resin can be suitably selected to be from about 20:1 or about 15:1 to about 1:1 or about 2:1, such as about 10:1 to about 3:1. Ratios outside of these ranges can also be used.

Figure 5:
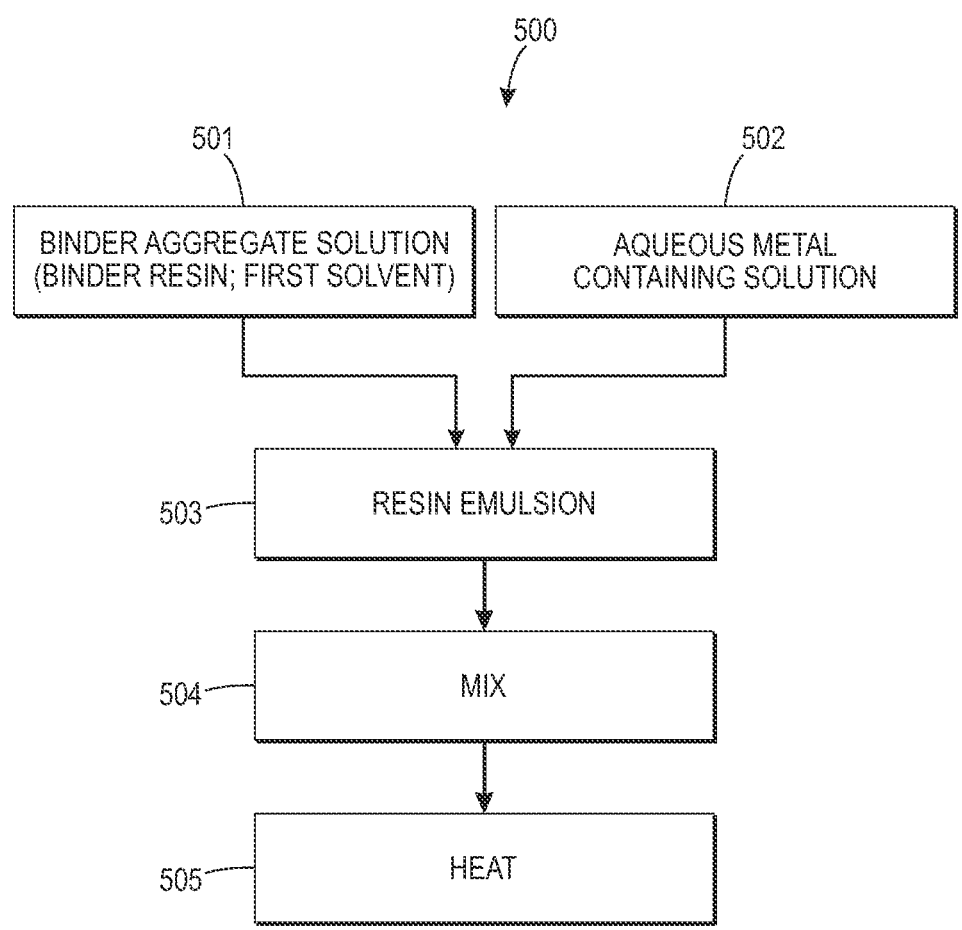
FIG. 5 illustrates a method for forming toner particles according to an embodiment.
Figure 6:
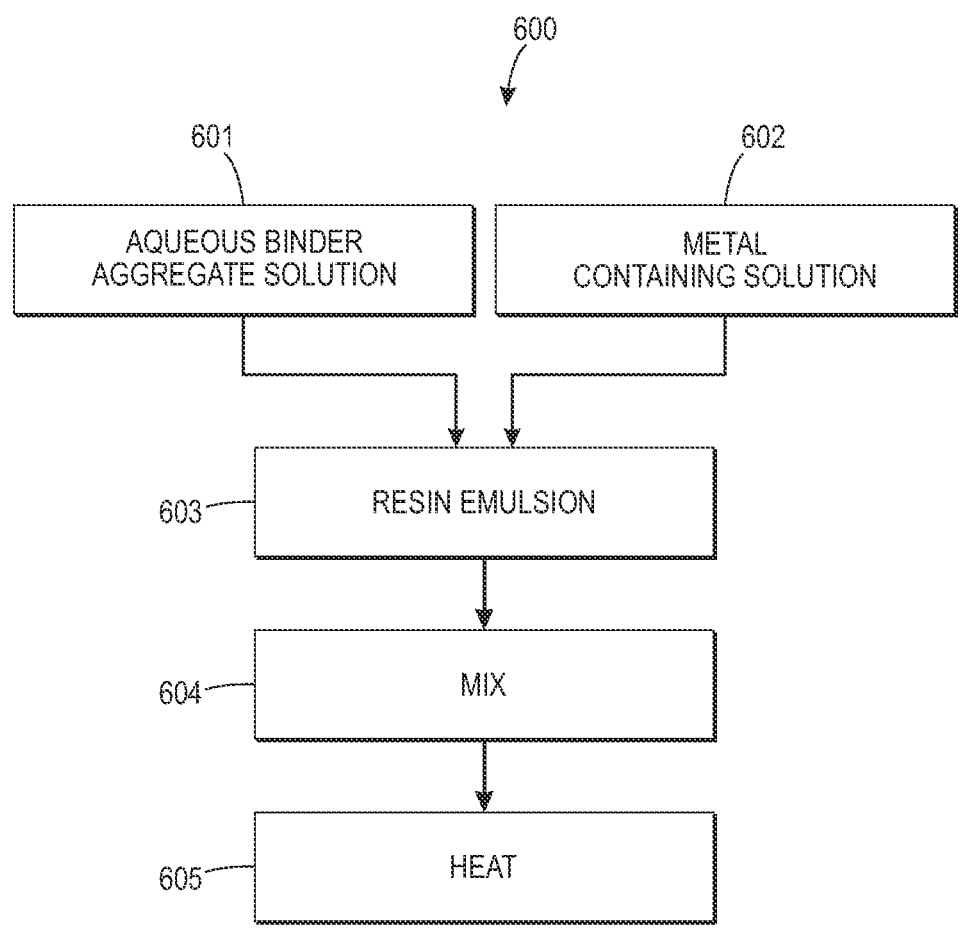
FIG. 6 illustrates a method for forming toner particles according to an embodiment.
Figure 7:
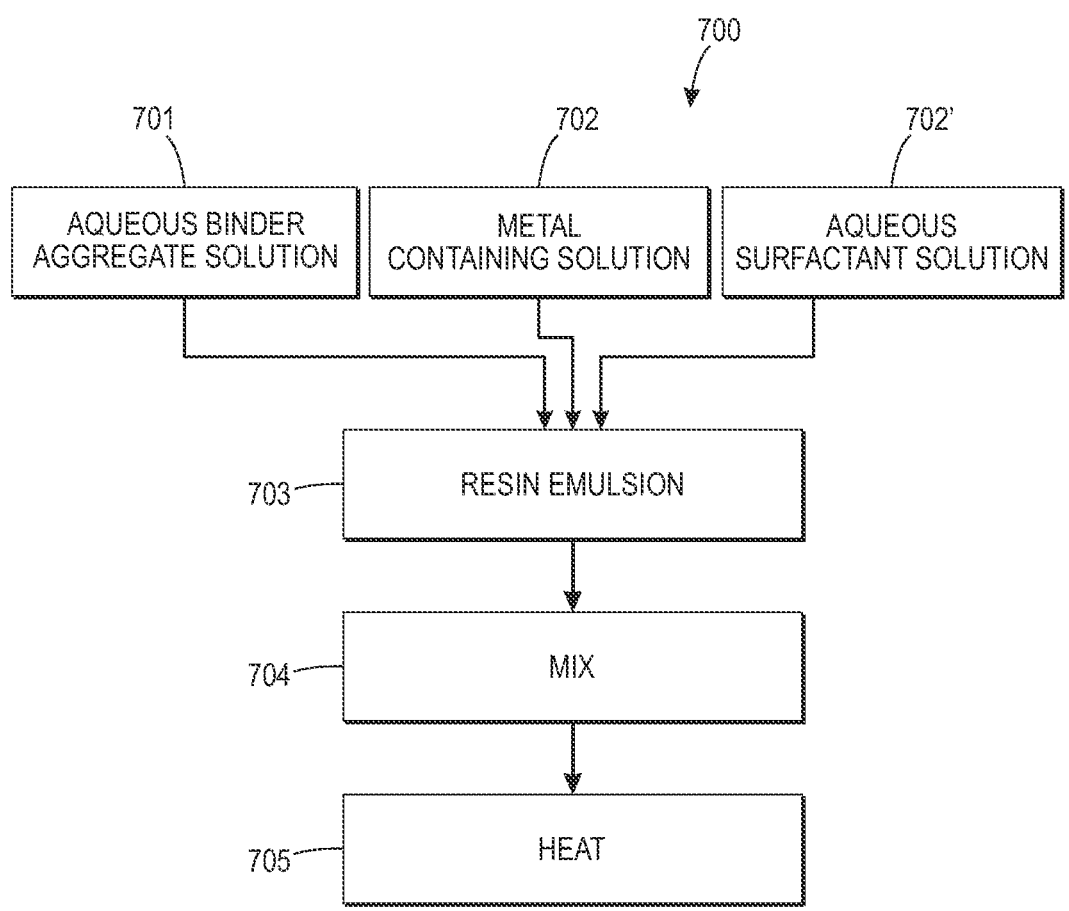
FIG. 7 illustrates a method for forming toner particles according to an embodiment.

Additional examples of organic solvents that are immiscible with water, which can be used in the PIE processes described herein, for example, the first, second, third and fourth organic solvents used in forming the metal-containing solutions 805' as described in FIGS. 5-7, include aromatic hydrocarbons, for example, toluene, benzene, xylene, mesitylene, and chlorobenzene; aliphatic hydrocarbon solvents, for example, pentane, hexane, heptane, octane, and cyclohexane; ester solvents, for example, ether, methyl ethyl acetate, ethyl acetate, and methyl t-butyl ether (MTBE); ketone solvents, for example, methyl isobutyl ketone and methyl ethyl ketone; halogenated aliphatic hydrocarbon solvents, for example, dichloromethane, dichloroethane, and carbon tetrachloride; halogenated saturated hydrocarbons, for example, methylene chloride; and mixtures thereof.

The phase inversion process disclosed herein next involves adding a phase inversion organic solvent to the resin/solvent mixture. The phase inversion organic solvent is typically chosen such that it is soluble with both the organic and aqueous phase. This is known in the art as the oil, or organic phase. An example of a phase inversion organic solvent is isopropanol. It has been found that the optimal ratio of the phase inversion organic solvent disclosed herein is approximately 1 to 3 parts of phase inversion solvent, such as isopropanol, per 10 parts of resin.

Other suitable ratios of phase inversion organic solvent to resin can be used, in embodiments, as desired. Thus, for example, the ratio of phase inversion organic solvent to resin can be suitably selected to be from about 10:1 or about 5:1 to about 1:5 or about 1:3, such as about 4:1 to about 1:2. Ratios outside these ranges can also be used.

Further examples of suitable phase inversion organic solvents include acetic acid, acetone, acetonitrile, diethylene glycol, diglyme, dimethoxy-ethane (glyme), dimethyl-sulfoxide (DMSO), dimethyl-formamide (DMF), dioxane, ethanol, ethylene glycol, glycerin, methanol, propan-1-ol, t-butyl alcohol, and mixtures thereof.

Although it is described here that the resin is first solubilized in an organic solvent, followed by addition of the phase inversion organic solvent, it is understood that this order of steps is not mandatory. Thus, for example, in embodiments a single step can be performed whereby the resin and other optional components are solubilized in the organic solvent at the same time that the phase inversion organic solvent is added, or the resin can be solubilized in an already prepared mixture of the organic solvent and phase inversion organic solvent.

The phase inversion process disclosed herein further involves a neutralization agent, or base chemical with a pH of from about 8 to about 14, such as ammonium hydroxide. Additional neutralization agents include, for example, ammonium chloride, and alkali metal hydroxides, such as NaOH. KOH and LiOH.

Although not limited by any theory, it is believed that the addition of a neutralization agent is responsible for ionizing the acid functionality of the resin, for example, a polyester resin, through its carboxylic acid residue. Typically, a ratio of 50% to 150% of neutralizing, agent is proportional to the percentage of acid groups available on the polyester resin.

The amount of neutralization ratio can be calculated using an equimolar amount to the acid value of the resin. Thus, neutralization ratio can be defined as the amount of base required neutralize the resin acidic groups. A neutralization ratio of 1.0 implies that every acidic moiety in the resin is neutralized by a base (hydroxide ion).

The phase inversion process disclosed herein next involves adding water to the mixture. Water can be added dropwise. Although not limited by any theory, this results in the phase inversion of the oil phase in the aqueous phase such that submicron oil droplets are formed.

The phase inversion process disclosed herein next involves removing the organic solvent, by, for example with heat such as during distillation. Additional removal techniques include extraction or flash evaporation.

The phase inversion process disclosed herein can be used to solubilize resin or a combination of resin and other components. Examples of other components that can be included in the emulsion are, for example, metal nanoparticles such as silver nanoparticles. Accordingly, the resulting resin emulsion can be a metal-containing solution, such as metal-containing solution 805', for forming a shell around a surface of aggregated particles as described further below.

In an embodiment, components used in the phase inversion process disclosed herein can include approximately 10 parts of resin (including a predetermined amount of silver nanoparticles), 5 to 7 parts of organic solvent, preferably methyl ethyl ketone, and 1 to 3 parts of phase inversion solvent, preferably isopropanol.

In an embodiment, a core shell toner particle includes metal nanoparticles disposed in the shell thereof. The core can be formed of a resin and the shell can include a matrix formed of a same or different resin as the core. The metal nanoparticles can be distributed in the matrix of the shell. The shell with metal nanoparticles can be formed from a metal-containing solution which is added to solution of aggregated core particles and forms a shell around the core particles.

The metal-containing solution for forming the shell can be prepared by a method 500, such as the PIE process. Method 500 includes: providing a binder aggregate solution 501 that can include an aggregate of a binder resin dispersed in a first organic solvent, forming a resin emulsion 503 comprising the binder aggregate solution 501 and an aqueous first metal-containing solution 502 that can include metal nanoparticles, mixing the resin emulsion in 504, and heating the resin emulsion in 505 to flash off the first organic solvent.

In an embodiment illustrated in FIG. 6, the shell can be formed utilizing another PIE process. For example, method 600 illustrates a PIE process for forming the metal-containing solution used for forming a shell and can include: providing a binder aggregate solution 601 that can include an aggregate of a binder resin dispersed in an aqueous solution, forming a resin emulsion 603 comprising the binder aggregate solution 601 and a first metal containing solution 602 that can include metal nanoparticles and a second organic solvent; mixing 604 the resin emulsion, and heating 605 the resin emulsion to flash off the second organic solvent.

In an embodiment illustrated in FIG. 7, the shell can be formed utilizing another PIE process. For example, method 700, illustrates a PIE process for forming the metal-containing solution used for forming a shell and can include: providing a binder aggregate solution 701 that can include an aggregate of a binder resin dispersed in a third organic solvent; forming a resin emulsion 703 comprising an aqueous surfactant solution 702', the binder aggregate solution 701, and a first metal-containing solution 702 that can include metal nanoparticles and a fourth organic solvent, mixing 704 the resin emulsion, and heating 705 the resin emulsion to distill the third and fourth organic solvents from the resin emulsion.

Figure 8:
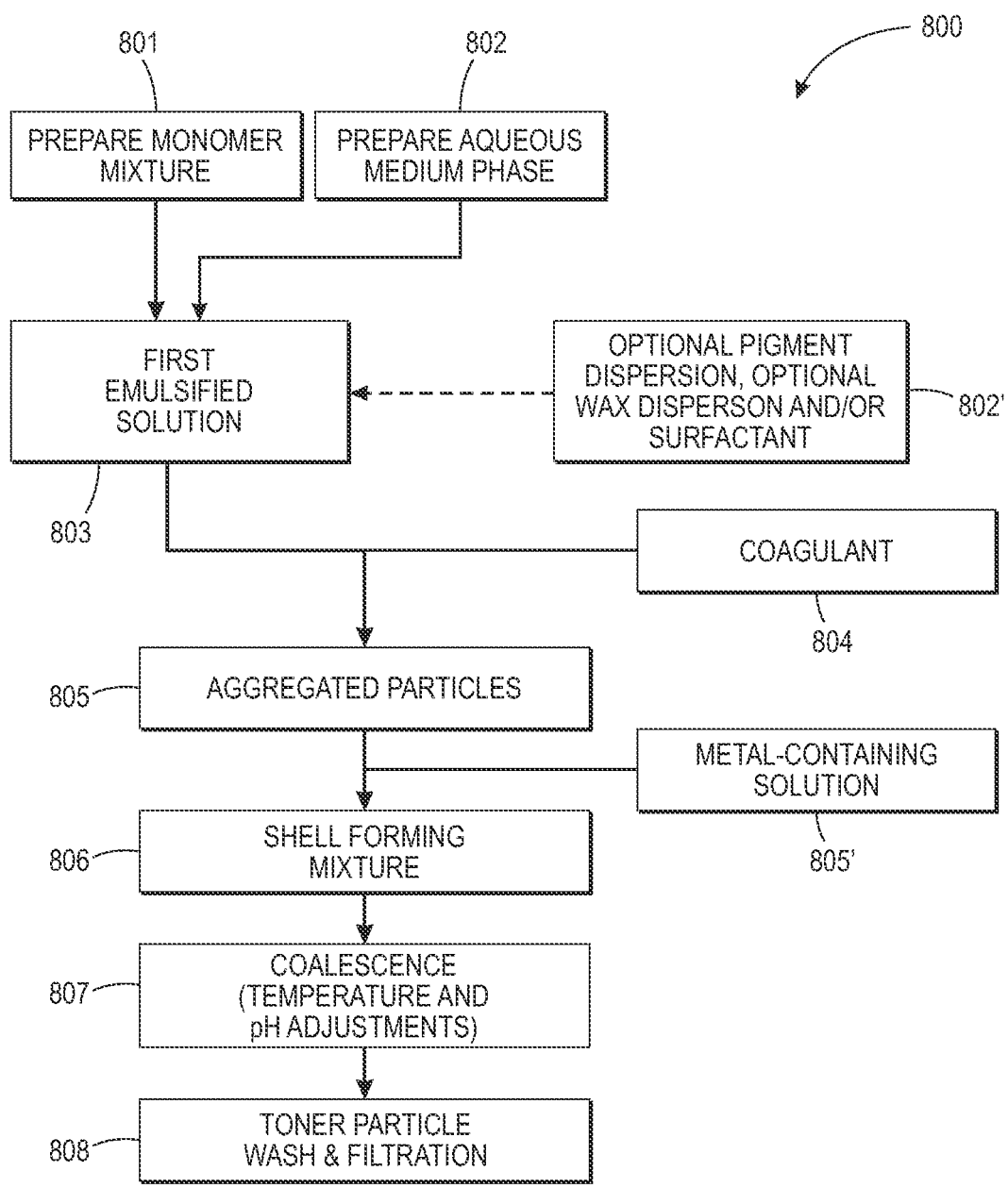
FIG. 8 illustrates a method for forming toner according to an embodiment.

As illustrated FIG. 8, the metal-containing solution used for forming the shell, such as shell 302 that includes the metal nanoparticles can be introduced after the binder aggregate particles of the core are formed, for example upon the core binder aggregate particles reach a predetermined size.

Emulsion Aggregation Method for Forming Core-Shell Toner Particles

The toner particles may be prepared by any method within the pureview of one skilled in the art. Although embodiments relating to core-shell toner particle production are described below with respect to emulsion aggregation processes, any suitable method of preparing toner particles may be used, including chemical processes, such as suspension and encapsulation processes. For example, in an embodiment illustrated in FIG. 8, the toner particles can be prepared by a method 800 which includes an aggregation process for forming core particles in which small-size particles are aggregated to an appropriate and/or predetermined particle size and no metal nanoparticles are formed in the particles, a shell forming process for forming a shell over the core particles to an appropriate and/or predetermined thickness with metal nanoparticles disposed in the shell, and a coalescence step in which the core-shell particles are formed to a final toner particle shape and morphology.

The growth and shaping of the toner particles may be accomplished under any suitable conditions. For example, the growth and shaping may be conducted under conditions in which aggregation occurs separate from coalescence. For separate coalescence and aggregation stages, the aggregation process may be conducted under shearing conditions at an elevated temperature, which may be below the glass transition temperature of the binder resin. The shell can be formed after the aggregation stage during a shell formation stage. The toner particle having a shell and core structure can be shaped together during the coalescence stage.

For example, in the emulsion aggregation process shown in FIG. 8, aggregated particles are formed by aggregating an optional mixture of a wax and any other desired additives 802', and an emulsion including a binder resin to form a first emulsified solution and then coalescing the aggregate mixture.

The emulsion including the binder resin can be a mixture of two or more emulsions containing at least the binder resin.

Emulsion

The emulsion, such as first emulsified solution 803, can be formed from a monomer mixture 801 comprising a polymerizable monomer and an aqueous medium phase 802 that includes an initiator solution and/or additional polymerization components that can be combined to provide, for example, a first emulsified solution 803 (i.e., a first emulsified solution) comprising an unsaturated amorphous polyester and/or crystalline polyester resin, for example, a binder resin. An optional pigment/colorant dispersion, an optional wax dispersion and/or surfactant 802' can be added to the first emulsified solution 803.

The pH of the resulting mixture of the resin and optional pigment, wax and/or surfactant forming the first emulsified solution 803, may be adjusted by addition of an acid, such as, for example, acetic acid, nitric acid or the like. In embodiments, the pH of the resulting mixture may be adjusted to from about 2 to about 4.5. Additionally, in embodiments, the mixture may be homogenized. If the mixture is homogenized, homogenization may be accomplished by mixing at about 600 to about 4,000 revolutions per minute (rpm) using any suitable means, for example, an IKA ULTRA Turrax T50 probe homogenizer.

Aggregation

An aggregating agent coagulant 804 such as an acid, metal halide such as polyaluminum chloride, or metal sulfate can be added to the first emulsified solution 803 to form a coagulated solution including aggregated particles.

In embodiments, the aggregating agent may be added to the mixture at a temperature that is below the glass transition temperature of the binder resin. The aggregating agent may be added to the emulsified solution in an amount of, for example, from about 0.1 part per hundred (pph) to about 1 pph, from about 0.25 pph to about 0.75 pph, and 0.5 pph to provide a sufficient amount of agent for aggregation to form the aggregated particles 805.

Metal ion such as $Al^{3+}$ can be retained in the aggregated particles. The amount of retained metal ion in the particle can be further adjusted with the addition of ethylene diamine tetraacetic acid (EDTA). Thus, in embodiments, the amount of retained crosslinker, for example $Al^{3+}$, can be in an amount of from about 0.1 pph to about 1 pph, from about 0.25 pph to about 0.8 pph, or about 0.5 pph.

In order to control aggregation and subsequent coalescences of the toner particles, in embodiments the aggregating agent coagulant 804 may be metered into the first emulsified solution mixture over time. For example, the aggregating agent may be metered into the mixture over a period of from about 5 to about 240 minutes, in embodiments from about 30 to about 200 minutes. The addition of the agent may also be performed while the mixture is maintained under stirred conditions, for example, while stirring at a rate of from about 50 rpm to about 1,000 rpm, or from about 100 rpm to about 500 rpm, and at a temperature that is below the glass transition temperature of the resin, for example, at a temperature in the range of from about 30° C. to about 90° C., or from about 35° C. to about 70° C.

The coagulated solution can be homogenized, for example, between from about 2,000 rpm to about 10,000 rpm to form a binder aggregate solution/mixture which can be a slurry comprising aggregated binder particles or an aggregate of the binder resin The aggregated particles may not include metal nanoparticles. That is, in embodiments, the aggregated particles formed thus far in the process and for the remainder of the toner particle formation process should be free of metal nanoparticles.

The aggregate mixture containing the aggregated binder resin particles can be heated at an elevated temperature. The elevated temperature can be, for example, a temperature below the glass transition temperature of the binder resin. The elevated temperature can be, for example, a temperature in the range of from about 40° C. to about 100° C., or from about 40° C. to about 90° C., or from about 45° C. to about 80° C. The aggregate mixture may be slowly brought to the elevated temperature by raising the temperature of the aggregate mixture containing the aggregated particles to the elevated temperature. For example, the aggregated mixture can be brought to an elevated temperature of about 60° C. within about 40 minutes. The heated aggregated mixture can be held at the elevated temperature for a period of time, for example, from about 0.5 hours to about 6 hours, or from about 1 hour to about 5 hours, while maintaining stirring, until the aggregated particles reach a predetermined size. Once the predetermined desired particle size is reached, the growth process for increasing the size of the aggregated particles is halted.

In an embodiment, the particle size can be monitored during the growth process until such predetermined particle size is reached, with samples being taken during the growth process and analyzed, for example, with a coulter counter, for average particle size.

In embodiments, the predetermined size of the aggregated particles can be, for example, diameters from 1 micron to about 12 microns, from about 1 micron to about 4 microns, from about 3 microns to about 12 microns or from about 4 microns to about 8 microns. In embodiments, the aggregate binder resin particles may be of a size of less than about 3 microns, from about 2 to about 3 microns, or from about 2.5 microns to about 2.9 microns.

Shell Formation

In embodiments, a shell comprising metal nanoparticles disposed therein can be formed over the formed aggregated particles. The shell can completely cover the core aggregated particles 805. That is, when the aggregated particles 805 are combined with the metal-containing solution 805' to form the shell forming mixture 806, a shell-latex of the metal-containing solution forms a shell over the aggregated particles with the metal nanoparticles of the metal-containing solution disposed in the shell. As described above, metal-containing solution 805' can be made according to the methods 500, 600 or 700. In embodiments, the metal-containing solution includes a same or a different resin as the aggregated particles 805. In embodiments, the metal-containing solution includes a resin with a higher Tg than the Tg of the resin of the aggregated particles 805.

In an embodiment, metal-containing solution 805' is added such that a shell forms over an outside surface of some, if not all, the aggregated particles 805, thereby forming a plurality of toner particles having a core-shell configuration such as toner particles 300 having a shell 302 with metal nanoparticles 303 disposed therein formed on a core 301 as shown in FIG. 3. The shell 302 can be formed over the core aggregate particle 300 by any method known by those skilled in the art.

For example, upon the aggregated particles reaching the predetermined size as described above, a metal-containing solution 805' that includes metal nanoparticles can be added to the aggregated particles to form a resin emulsion shell forming mixture.

In embodiments, an amorphous polyester may be utilized to form a shell over each, or substantially each, of the aggregated particle. As an example, the metal-containing solution can include a latex that is highly crosslinked, such as a 28% polyester gel latex. While not limited by any particular theory, it is believed that when added to the aggregated particles, a metal-containing mixture that includes a polyester (or styrene acrylate) gel with amorphous binder permits the use of high temperatures to form a shell and subsequent coalescence of the toner particles. This may prevent crystalline polyester from the aggregated particles from migrating to a surface of the toner particles.

After a first portion of metal-containing solution 805' is added to the aggregated particle solution 805, additional amounts of metal-containing solution 805' or shell latex alone can be intermittently or continuously added to form additional volume of shell forming mixture 806. In an example, shell latex is added until toner particles reach a predetermined size of from about 3 microns to about 12 microns, or from about 4 microns to about 8 microns.

Metal-containing solution 805' may be added to aggregated particles 805 in an amount of about 5 to about 40 wt % or preferably in an amount of 5 to about 30 wt % of the total binder materials.

In an embodiment, an amount of metal-containing solution and an optional additional amount of shell latex can be added to the aggregated particles such that the formed toner particles comprising a core surrounded by a shell have a shell with a thickness of between about 0.001 μm to about 2.0 μm, for example between about 0.2 μm to about 1.5 μm, and preferably a between about 0.5 μm to about 1.0 μm. In an embodiment, an amount of metal-containing solution and an optional additional amount of shell latex can be added to the aggregated particles such that the formed toner particles comprising a core surrounded by a shell have a weight % of metal nanoparticles formed in the shell of about 0.00001 wt % to about 10 wt %, for example, 0.02 wt % to about 10 wt %, or about 0.01 wt % to about 6 wt % by weight of the toner particles.

The shell matrix material, such as a shell resin, can be present in an amount of from about 10% to about 32%, or from about 24% to about 30% by weight of the toner particles.

A total of amount of binder in the toner particles can be an amount of from about 60 wt % to about 95 wt %. or about 70 wt % to about 90 wt % of the toner particles, exclusive of external additives, and on a solids basis.

Once the desired final size of the core-shell toner particle is achieved, a pH of the shell forming mixture may be adjusted to stop core-shell toner particle growth. For example, growth can be stopped by addition of a base to bring the pH of the shell-forming mixture to a value in the range of from about 6 to about 10, or to a value in the range of from about 6.2 to about 7. A suitable base includes, for example, alkalai metal hydroxides such as, for example, sodium hydroxide, potassium hydroxide, ammonium hydroxide, combinations thereof, and the like. In embodiments, EDTA may be added to help adjust the pH to a value in the range discussed above. The base may be added in amounts from about 2% to about 25%, or from about 4 to about 10% by weight of the shell forming mixture Coalescence Following aggregation to the desired aggregate particle size with the formation of the shell as described above, the core-shell toner particles may be coalesced to a desired final shape, for example, by heating the mixture.

For example, during a coalescence stage 807, mixture containing the core-shell toner particles can be heated to a temperature that may be below the melting point of the binder resin, for example a crystalline resin, to prevent plasticization. For example, the mixture 806 containing the core-shell toner particles 300 can be heated to a temperature of from about 30° C. to about 100° C., such as a temperature of from about 30° C. to about 50° C., or a temperature from about 55° C. to about 100° C. such as a temperature from about 63° C. to about 90° C. or such as a temperature from about 65° C. to about 75° C. Higher or lower temperatures may be used depending on the resin used for the binder.

The coalescence stage may proceed and be accomplished over a period of from about 0.1 to about 9 hours, or from about 0.5 to about 4 hours.

After coalescence, the mixture containing the core-shell toner particles with the metal nanoparticles disposed in the shell may be cooled to room temperature, such as from about 20° C. to about 25° C. The cooling may occur rapidly or slowly. A suitable cooling method may include introducing cold water to a jacket formed around the vessel, such as a reactor, containing the mixture with the core-shell toner particles. The toner particles coalesced in stage 807 can then be washed with water, filtered, and then dried at 808. Drying may be accomplished by any suitable method for drying including, for example, freeze drying.

Monomer

The polymerizable monomer used herein for forming the resin in the emulsified solution may include at least one selected from the group consisting of: styrene-based monomers such as styrene, vinyltoluene, or α-methylstyrene; acrylic acids, methacrylic acids; derivatives of (meth)acrylic acid such as methyl acrylate, ethyl acrylate, propyl acrylate, butyl acrylate, 2-ethylhexyl acrylate, dimethylaminoethyl acrylate, methyl methacrylate, ethyl methacrylate, propyl methacrylate, butyl methacrylate, 2-ethylhexyl methacrylate, dimethylaminoethyl methacrylate, acrylonitrile, methacrylonitrile, acrylamide, or methacrylamide; ethylenically unsaturated monoolefins such as ethylene, propylene, butylene or butadiene; halogenated vinyls such as vinyl chloride, vinylidene chloride, or vinyl fluoride; vinyl esters such as vinyl acetate or vinyl propionate; vinyl ethers such as vinylmethylether or vinylethylether; vinyl ketones such as vinylmethylketone or methylisoprophenylketone; a nitrogen-containing vinyl compound such as 2-vinylpyridine, 4-vinylpyridine, or N-vinylpyrrolidone; and a polyether-based monomer, a polyamide-based monomer and a polyurethane-based monomer that have a polymerizable functional group in a molecular chain. These compounds may be used alone or in a combination of at least two compounds.

Initiator

Examples of the polymerization initiator include, but are not limited to: persulfates such as potassium persulfate or ammonium persulfate; azo compounds such as 4,4-azobis (4-cyano valeric acid), dimethyl-2,2'-azobis(2-methylpropionate), 2,2-azobis(2-amidinopropane)dihydrochloride, 2,2-azobis-2-methyl-N-1,1-bis(hydroxymethyl)-2-hydroxyethylpropioamide, 2,2'-azobis(2,4-dimethylvaleronitrile), 2,2'-azobisisobutyronitrile, or 1,1'-azobis(1-cyclohexancarbonitrile); and peroxides such as methylethylperoxide, di-t-butylperoxide, acetylperoxide, dikumylperoxide, lauroylperoxide, benzoylperoxide, t-butylperoxy-2-ethyl hexanoate, di-isopropylperoxydicarbonate, or di-t-butylperoxyisophthalate, and the like. An oxidation-reduction initiator may be formed by combining the polymerization initiator and a reducer. The amount of the polymerization initiator is from about 0.01 to about 5, or from about 0.1 to about 3 parts by weight based on 100 parts by weight of the polymerizable monomer.

Binder Resin

The core can include one or more of a binder resin. For example, the binder resin can be a crystalline and/or an amorphous polyester binder resin. Examples of additional suitable binder resin include, but are not limited to, styrene resins, acryl resins, vinyl resins, polyether polyol resins, phenol resins, silicon resins, epoxy resins, polyamide resins, polyurethane resins, and polybutadiene resins.

Other suitable binder resins include, without limitation, thermoplastic resins, homopolymers of styrene or substituted styrenes such as polystyrene, polychloroethyene, and polyvinyltoluene; styrene copolymers such as styrene-p-chlorostyrene copolymer, styrene-propylene copolymer, styrene-vinyltoluene copolymer, styrene-vinylnaphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-methyl .alpha.-chloromethacrylate copolymer, styrene-acrylonitrile copolymer, styrene-vinyl methyl ether copolymer, styrene-vinyl ethyl ether copolymer, styrene-vinyl methyl ketone copolymer, styrene-butadiene copolymer, styrene-isoprene copolymer, styrene-acrylonitrile-indene copolymer, styrene-maleic acid copolymer, and styrene-maleic acid ester copolymer; polymethyl methacrylate; polybutyl methacrylate; polyvinyl chloride; polyvinyl acetate; polyethylene; polypropylene; polyvinyl butyral; polyacrylic resin; rosin; terpene resin; phenolic resin; aliphatic hydrocarbon resin; aromatic petroleum resin; chlorinated paraffin; paraffin wax, and the like. These binder resins can be used alone or in combination.

Amorphous Polyester Resins

In embodiments, the binder resins may be linear or branched amorphous polyester polymers such as polyethylene-terephthalate, polypropylene-terephthalate, polybutylene-terephthalate, polypentylene-terephthalate, polyhexylene-terephthalate, polyheptadene-terephthalate, polyoctalene-terephthalate, polyethylene-sebacate, polypropylene sebacate, polybutylene-sebacate, polyethylene-adipate, polypropylene-adipate, polybutylene-adipate, polypentylene-adipate, polyhexylene-adipate, polyheptadene-adipate, polyoctalene-adipate, polyethylene-glutarate, polypropylene-glutarate, polybutylene-glutarate, polypentylene-glutarate, polyhexylene-glutarate, polyheptadene-glutarate, polyoctalene-glutarate polyethylene-pimelate, polypropylene-pimelate, polybutylene-pimelate, polypentylene-pimelate, polyhexylene-pimelate, polyheptadene-pimelate, poly(propoxylated bisphenol-fumarate), poly(propoxylated bisphenol-succinate), poly(propoxylated bisphenol-adipate), poly(propoxylated bisphenol-glutarate), SPAR™ (Dixie Chemicals), BECKOSOL™ (Reichhold Inc), ARAKOTE™ (Ciba-Geigy Corporation), HETRON™ (Ashland Chemical), PARAPLEX™ (Rohm & Hass), POLYLITE™ (Reichhold Inc), PLASTHALL™ (Rohm & Hass), CYGAL™ (American Cyanamide), ARMCO™ (Armco Composites), ARPOIL™ (Ashland Chemical), CELANEX™ (Celanese Eng), RYNITE™ (DuPont), STYPOL™ (Freeman Chemical Corporation), mixtures thereof, and the like.

The binder resin may have a weight average molecular weight (Mw) of from about 2,000 to about 600,000, such as from about 20,000 to about 600,000, such as from about 7,000 to about 300,000 (as determined by GPC using polystyrene standards). The binder resin may have a number average molecular weight (Mn) of from about 1,000 to about 500,000, such as from about 10,000 to about 500,000, such as from about 5,000 to about 250,000 (as measured by gel permeation chromatography (GPC)), although the value can be outside of these The amorphous polyester resins may be prepared by suitable means known in the art, and then be incorporated into a toner composition. For example, a polypropoxylated bisphenol A fumarate polyester, Bisphenol A, propylene oxide or propylene carbonate and fumaric acid may be used as monomeric components in the process of the present disclosure while a propoxylated bisphenol A fumarate may be utilized as a seed resin to facilitate formation of the latex. A linear propoxylated bisphenol A fumarate resin which may be utilized as a seed resin is available under the trade name SPARII from Resana S/A Industrias Quimicas, Sao Paulo, Brazil. Other commercially available propoxylated bisphenol A fumarate resins include GTUF and FPESL-2 from Kao Corporation, Japan, and EM181635 from Reichhold, Research Triangle Park, N.C., and the like.

Crystalline Polyester Resin

In addition, the core portion of the toner particles may include one or more crystalline polyester resins. Examples of crystalline polyester resins include poly(ethylene-adipate), poly(propylene-adipate), poly(butylene-adipate), poly (pentylene-adipate), poly(hexylene-adipate), poly(octylene-adipate), poly(nonylene-adipate), poly(decylene-adipate), poly(undecylene-adipate), poly(ododecylene-adipate), poly(ethylene-glutarate), poly(propylene-glutarate), poly(butylene-glutarate), poly(pentylene-glutarate), poly(hexylene-glutarate), poly(octylene-glutarate), poly(nonylene-glutarate), poly(decylene-glutarate), poly(undecylene-glutarate), poly(ododecylene-glutarate), poly(ethylene-succinate), poly(propylene-succinate), poly(butylene-succinate), poly(pentylene-succinate), poly(hexylene-succinate), poly(octylene-succinate), poly(nonylene-succinate), poly(decylene-succinate), poly(undecylene-succinate), poly(ododecylene-succinate), poly(ethylene-pimelate), poly(propylene-pimelate), poly(butylene-pimelate), poly(pentylene-pimelate), poly(hexylene-pimelate), poly(octylene-pimelate), poly(nonylene-pimelate), poly(decylene-pimelate), poly(undecylene-pimelate), poly(ododecylene-pimelate), poly(ethylene-sebacate), poly(propylene-sebacate), poly(butylene-sebacate), poly(pentylene-sebacate), poly(hexylene-sebacate), poly(octylene-sebacate), poly(nonylene-sebacate), poly(decylene-sebacate), poly(undecylene-sebacate), poly(ododecylene-sebacate), poly(ethylene-azelate), poly(propylene-azelate), poly(butylene-azelate), poly(pentylene-azelate), poly(hexylene-azelate), poly(octylene-azelate), poly(nonylene-azelate), poly(decylene-azelate), poly(undecylene-azelate), poly(ododecylene-azelate), poly(ethylene-dodecanoate), poly(propylene-dodecanoate), polybutylene-dodecanoate), poly(pentylene-dodecanoate), poly(hexylene-dodecanoate), poly(octylene-dodecanoate), poly(nonylene-dodecanoate), poly(decylene-dodecanoate), poly(undecylene-dodecanoate), poly(ododecylene-dodecanoate), poly(ethylene-fumarate), poly(propylene-fumarate), poly(butylene-fumarate), poly(pentylene-fumarate), poly(hexylene-fumarate), poly(octylene-fumarate), poly(nonylene-fumarate), poly(decylene-fumarate), poly(undecylene-fumarate), poly(ododecylene-fumarate), copoly-(butylene-fumarate)-copoly-(hexylene-fumarate), copoly-(ethylene-dodecanoate)-copoly-(ethylene-fumarate), mixtures thereof, and the like.

The crystalline resin may have a number average molecular weight (Mn), as measured by gel permeation chromatography (GPC), of from about 1,000 to about 50,000, such as from about 2,000 to about 25,000, although the value may be outside of these ranges. The crystalline resin may have a weight average molecular weight (Mw) as determined by GPC using polystyrene standards, of from about 2,000 to about 100,000, such as from about 3,000 to about 80,000, although the value may be outside of these ranges;

Crystalline polyester resins may be prepared by any known means in the art, such as by a polycondensation process involving reacting an organic diol and an organic diacid in the presence of a polycondensation catalyst. Although generally, a stoichiometric equimolar ratio of organic diol and organic diacid is utilized. However, in some instances wherein the boiling point of the organic diol is from about 180.degree. C. to about 230.degree. C., an excess amount of diol can be utilized and removed during the polycondensation process. Additional amounts of acid may be used to obtain a high acid number for the resin, for example an excess of diacid monomer or anhydride may be used. The amount of catalyst utilized varies, and can be selected in an amount, for example, of from about 0.01 to about 1 mole percent of the resin, although the amount may be outside of this range.

Aggregating Agent

Suitable aggregating agent/coagulant include, for example, aqueous solutions of a divalent cation or a multivalent cation material. The aggregating agent may be, for example, polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride calcium nitrite, calcium oxlate, calcium sulfate, magnesium cetate, magnesium nitrate, magnesium sulfate, zinc acetate, zinc nitrate, zinc sulfate zinc chloride, zinc bromide, magnesium bromide, copper chloride, copper sulfate and combinations thereof.

Surfactant

The surfactant may be a material that is dissolvable in an organic solution and/or aqueous solution having polarity of 1.8 or more in consideration of a solvent or a binder region when a toner is prepared. Examples of the surfactant may include: an anionic surfactant such as salts of sulfate ester-based anionic surfactant, salts of sulfonate-based anionic surfactant, salts of phosphate ester-based anionic surfactant, and a soap-based anionic surfactant; a cationic surfactant such as an amine-salt cationic surfactant, and a quaternary ammonium salt cationic surfactant; and a nonionic surfactant such as a polyethylene glycol-based nonionic surfactant, an alkylphenolethyleneoxide adduct-based nonionic surfactant, and a polyvalent alcohol-based nonionic surfactant.

Pigment/Colorant:

The toner according to the present disclosure may be produced as a colored toner, by adding a colorant during toner production. In the case of a toner to form black and white images, the toner may include carbon black or aniline black as the colorant. In the case of a color toner, the color toner may use carbon black as a black colorant, and may include yellow, magenta and cyan colorants as color pigments.

Suitable colorants for use in the toner according to the present disclosure include, without limitation, carbon black, lamp black, iron black, ultramarine, Aniline Black, Aniline Blue, azo oil black, Basic 6G Lake, Benzidine Yellow, Benzimidazolone Brown HFR, Benzimidazolone Carmine HF3C, Brilliant Green lakes, carbon black, Chrome Yellow, Dioxazine Violet, disazo pigments, Disazo Yellow AAA, Du Pont Oil Red, Fast Yellow G, Hansa Brilliant Yellow 5GX, Hansa Yellow, Hansa Yellow G, Lake Red C, Malachite Green hexylate, Malachite Green, metallic salts of salicylic acid and salicylic acid derivatives, Methyl Violet Lake, Methylene Blue Chloride Methylene Blue, monoazo pigments, Naphthol Red HFG, Naphtol Yellow, Nigrosine dye, oil black, Phthalocyanine Blue, Phthalocyanine Green, quinacridone, Quinoline Yellow; Rhodamine 6G Lake, Rhodamine B; Rose Bengale, Tartrazine Lake, tertiary ammonium salts, titanium oxide, trisazo pigments, Ultramarine Blue, Victoria Blue, Watching Red, mixtures thereof, and the like. The amount of colorant can vary over a wide range, for instance, from about 3 to about 20 weight % of the total toner weight, and combinations of colorants may be used.

The yellow colorant may be a condensed nitrogen compound, an isoindolinone compound, an anthraquinone compound, an azo metal complex, or an allyl imide compound. Examples of the yellow colorant include, but are not limited to, C.I. (color index) pigment yellows 12, 13, 14, 17, 62, 74, 83, 93, 94, 95, 109, 110, 111, 128, 129, 147, 168, and 180.

Examples of the magenta colorant include, but are not limited to, condensed nitrogen compounds, anthraquine compounds, quinacridone compounds, base dye lake compounds, naphthol compounds, benzo imidazole compounds, thioindigo compounds, and perylene compounds. Examples of the magenta colorant can include, but are not limited to, C.I. pigment reds 2, 3, 5, 6, 7, 23, 48:2, 48:3, 48:4, 57:1, 81:1, 122, 144, 146, 166, 169, 177, 184, 185, 202, 206, 220, 221, and 254.

Examples of the cyan colorant can include, but are not limited to, copper phthalocyanine compounds and derivatives thereof, anthraquinone compounds, and base dye lake compounds. Examples of the cyan colorant can include, but are not limited to, C.I. pigment blues 1, 7, 15, 15:1, 15:2, 15:3, 15:4, 60, 62, and 66.

These colorants may be used alone or in combination of at least two thereof, and may be selected in consideration of color, chromaticity, brightness, weather resistance (e.g., resistance to environmental exposure), or dispersibility in toner.

The colorant may be of any amount so as to color the toner. For example, the amount of the colorant may be from about 0.1 to about 20, or from about 2 to about 10 parts by weight based on 100 parts by weight of the binder resin. When the amount of the colorant is from about 0.1 to about 20 parts by weight based on 100 parts by weight of the binder resin, the coloring effect of the colorant may be sufficiently obtained, the manufacturing costs of the toner may not be increased, and a sufficient quantity of friction electric charge may be obtained.

Wax Releasing Agent

One or more waxes for wax releasing agent may be added to the toner, in order to raise the image density and to effectively prevent the offset to a reading head and the image smearing. The wax can be present in an amount of, for example, from about 0.1 to about 10 weight % or in an amount of from about 1 to about 6 weight % based on the total weight of the toner composition. Examples of suitable waxes include, but are not limited to, polyolefin waxes, such as low molecular weight polyethylene, polypropylene, a fluorocarbon-based wax (Teflon), or Fischer-Tropsch wax, copolymers thereof, mixtures thereof, and the like.

Suitable wax releasing agents may be selected according to desired properties of a target toner. Examples of suitable releasing agents include, but are not limited to, polyethylene-based wax, polypropylene-based wax, silicon wax, paraffin-based wax, ester-based wax, carnauba wax, and metallocene wax.

The wax releasing agent may be wax having a melting point of about 50° C. to about 150° C. so as to increase the releasing properties of the releasing agent. As the melting point of the releasing agent is further increased, the dispersibility of toner particles may deteriorate and/or decrease. As the melting point of the releasing agent is reduced and/or decreased, even though the dispersibility of the toner particles may be improved, the melting point of the releasing agent may be in the range of about 50° C. to about 150° C., depending on environmental factors inside an electrophotographic device that uses toner, and the fixability of a final printed image. The releasing agent may be physically attached to the toner particles, but may not be bonded (e.g., covalently bonded) with them. The releasing agent can fix the toner to a final image receptor at a decreased (e.g., low) fixing temperature and have increased final image durability and abrasion-resistance characteristics.

The amount of the releasing agent may be, for example, from about 1 to about 20, or from about 1 to about 10 parts by weight based on 100 parts by weight of the binder resin. When the amount of the releasing agent is from about 1 to about 20 parts by weight based on 100 parts by weight of the binder resin, the releasing properties and durability of a prepared toner may be improved and/or increased.

Metal Nanoparticles

The metal nanoparticles can be spherical metal nanoparticles. The metal nanoparticles may be at least one selected from the group consisting of silver (Ag), gold (Au), platinum (Pt), palladium (Pd), iron (Fe), nickel (Ni), aluminum (Al), antimony (Sb), tungsten (W), terbium (Tb), dysprosium (Dy), gadolinium (Gd), europium (Eu), neodymium (Nd), praseodymium (Pr), strontium (Sr), magnesium (Mg), copper (Cu), zinc (Zn), cobalt (Co), manganese (Mn), chromium (Cr), vanadium (V), molybdenum (Mo), zirconium (Zr), and barium (Ba).

The spherical metal nanoparticle may have a volume average diameter of, for example, about 10 to about 100 nm, about 15 to about 70 nm, or about 20 to about 50 nm, or such a volume average diameter such that the spherical metal nanoparticle may be equally or about equally dispersed in the shell portion of the toner particles.

Additives

The electrophotographic toner may include one or more additives such as a charge control agent, a UV stabilizer, a mildewcide, a bactericide, a fungicide, an antistatic agent, a gloss modifier, an antioxidant, an anti-coagulation such as silane or a silicon-modified silica particle, which may be used alone or in a combination of at least two thereof.

An external additive can be added to the dried toner particles, and the amount of charges is controlled, so as to form a final dry toner. The external additive may be silica, metal oxide, or polymer bead. The external additive may prevent caking in which toner particles can be aggregated to each other due to an aggregation force there between, a roller contamination due to an excessive amount of the external additive that is greater than a predetermined threshold may be prevented and/or minimized, and a predetermined stable quantity of electric charge may be obtained

EXAMPLES

Example 1 Production of Toner Particles with Silver (Ag) Nanoparticles Added During Aggregation/Coalescence Preparation of Non-Pigmented Polyester Toner with 1% Silver Nanoparticles:

The following are added in a glass kettle and homogenized using IKA ULTRA-TURRAX® T50 homogenizer at 4000 rpm: 1) 101.43 g of amorphous polyester resin emulsion (207 nm; 33.44 wt %; 56° C. $T_g$); 2) 99.03 g of amorphous polyester resin emulsion (215 nm; 34.25 wt %; 60.5° C. $T_g$); 3) 35.56 g of crystalline polyester resin emulsion (151 nm; 25.74 wt %; 71.04° C. $T_m$); 4) 3.3 g of anionic surfactant DOWFAX® 2A1; 5) 42.23 g of polyethylene wax emulsion; and 6) 350.69 g of deionized water.

Thereafter a flocculent agent of 2.51 g of $Al_2(SO_4)_3$ mixed with 67.18 g of deionized water is added drop-wise to the kettle and homogenized for 10 minutes.

The mixture is degassed for 20 minutes at 280 RPM, heated at a rate of 1° C. per minute to 37° C. at 350 RPM for aggregation, until the particle size is 5.0 μm.

A shell mixture is separately formed and immediately added to the above aggregation, and allowed to further aggregate for another 10-20 minutes at 40° C., 350 rpm. The shell mixture contains 4.0 g (based on solid weight) of Ag nanoparticles prepared or purchased as described above; 58.61 g of 56° C. $T_g$ amorphous polyester resin emulsion (207 nm; 33.44 wt %), 57.23 g of 60.5° C. $T_g$ amorphous polyester resin emulsion (215 nm; 34.25 wt %), 1.67 g of DOWFAX® 2A1 and 40.96 g of deionized water.

As long as the volume average particle diameter is above 5.7 µm, the pH of the aggregation slurry is adjusted to 4 by adding 4 wt % of NaOH solution, followed by adding 5.38 g EDTA. The rpm is adjusted to 170 to stop aggregation, and the pH of the toner slurry is maintained at pH 7.5 by continuously adding 4 wt % of NaOH solution until the temperature reaches 85° C. for coalescence. The toner has a final particle size of 5.80 µm, GSD v/n 1.20/1.25, and circularity of 0.960. The toner slurry is then cooled to room temperature, separated by sieving (20 µm), filtered, washed, and freeze dried.

Example 2 Production of Toner Particles with Silver (Ag) Nanoparticles Added During Phase Inversion Emulsification (PIE)

Preparation of "Resin Emulsion A" Containing 1% Silver Nanoparticles:

328.77 g of amorphous propoxylated bisphenol A fumarate resin ($M_w$=12,500, $T_g$ onset=56.9° C., acid value=16.7 mg KOH/g resin), 1.84 g of silver nanoparticles, and 44.09 g of carnauba wax are dissolved in 2322 g of ethyl acetate at 70° C.

Separately, 4.0 g of DOWFAX® 2A1 solution and 6.3 g of concentrated ammonium hydroxide are dissolved in 1790 g of deionized water at 70° C.

The ethyl acetate solution is then poured slowly into the aqueous solution under continuous high-shear homogenization (10,000 rpm, IKA ULTRA-TURRAX® T50).

After an additional 30 minutes of homogenization, the reaction mixture is distilled at 80° C. for two hours.

The resulting emulsion is stirred overnight, strained through a 25-micron sieve, and centrifuged at 3000 rpm for 15 minutes. The supernatant is decanted and yielded 877.5 g a latex, with about 170 nm average particle size and 18% solids.

Examples 3—Production of Toner

Preparation of Cyan Toner Containing Emulsion Containing 1% Silver Nanoparticles:

In a 2 L reactor vessel are added 595.27 g of the above Resin Emulsion A having a solids loading of 18 weight %, along with 87.48 g of crystalline polyester emulsion (CPE) having a solids loading of 18 weight %, 63.48 g of cyan pigment PB 15:3 having a solids loading of 17 weight %, 2 g of DOWFAX® 2A1 surfactant having a solids loading of 47.68 weight %, 123 g of 0.3M $HNO_3$, and 395 g of a deionized water and stirred using an IKA ULTRA-TURRAX® 50 homogenizer operating at 4,000 rpm.

Thereafter, 36 g of a flocculent mixture containing 3.6 g polyaluminum chloride mixture and 32.4 g of a 0.02 molar (M) nitric acid solution are added dropwise over a period of 5 minutes. As the flocculent mixture is added drop-wise, the homogenizer speed is increased to 5,200 rpm and homogenized for an additional 5 minutes.

Thereafter, the mixture is heated at a 1° C. per minute temperature increase to a temperature of 41° C. and held there for a period of about 1.5 hours to about 2 hours resulting in a volume average particle diameter of 5 microns as measured with a Coulter Counter. During this heat up period, the stirrer is run at about 450 rpm.

An additional 282.2 g of the above Resin Emulsion A, 75 g of deionized water, and 10 g of 0.3 M $HNO_3$ are added to the reactor mixture and allowed to aggregate for an additional period of about 30 minutes at which time the reactor temperature is increased to 49° C. resulting in a volume average particle diameter of about 5.7 microns.

The pH of the reactor mixture is adjusted to 6 with a 1.0 M sodium hydroxide solution, followed by the addition of 1.048 g of VERSENE™ 100. The reactor mixture is then heated at a temperature increase of 1° C. per minute to a temperature of 68° C. The pH of the mixture is then adjusted to 6.0 with a 0.3 M nitric acid solution. The reactor mixture is then gently stirred at 68° C. for about 3 hours to spherodize the particles. The reactor heater is then turned off and the mixture is allowed to cool to room temperature at a rate of 1° C. per minute.

The toner of this mixture has a volume average particle diameter of about 5.7 microns, and a geometric size distribution (GSD) of about 1.24. The particles are washed five times, the first wash being conducted at pH 9 at 23° C., followed by 1 wash with deionized water at room temperature, followed by one wash at pH 4.0 at 40° C., and two additional washes with deionized water at room temperature.

Utilizing atomic force microscopy (AFM) and transmission electron microscopy (TEM) toner particles exhibiting the morphology of colloidal silver nanoparticles can be observed.

Nanosilver can be detected by UV-vis spectros-copy (UV-vis) since it has a distinct SPR peak in the UV-Vis region (420-450 nm (blue to red shift) via absorption method). UV-vis spectroscopy can be utilized for measuring nanosilver concentration with relatively low detection limits (g/L range). SPR contains information on size, aggregation and surface chemistry since the peak shifts in response to change in these parameters.

Themogravimetric analysis (TGA), for instances, would show three stages of weight loss. In stage one, from 0° C.-100° C., there would be an initial weight loss of 0.1 to 4% due to the evaporation of adsorbed water molecules. A second and even third weight loss would be seen from further slow evaporation of absorbed water molecules (100° C.-450° C.) and organic moieties from polymer binder in toner (450° C.-1100° C.) which would total from 80 to 95% depending on silver content. On further heating up to 1300° C. the metal nano-particles get melted to a liquid state and will make up the rest of the weight loss depending on amount of silver added to toner.

Comparative Example 1

Production of Toner without Silver Nanoparticles

The following are added in a glass kettle and homogenized using IKA ULTRA-TURRAX® T50 homogenizer at 4000 rpm: 1) 101.43 g of amorphous polyester resin emulsion (207 nm; 33.44 wt %; 56° C. Tg); 2) 99.03 g of amorphous polyester resin emulsion (215 nm; 34.25 wt %; 60.5° C. Tg); 3) 35.56 g of crystalline polyester resin emulsion (151 nm; 25.74 wt %; 71.04° C. Tm); 4) 3.3 g of anionic surfactant DOWFAX® 2A1; 5) 42.23 g of polyethylene wax emulsion; and 6) 350.69 g of deionized water.

Thereafter a flocculent agent of 2.51 g of $Al2(SO4)3$ mixed with 67.18 g of deionized water is added drop-wise to the kettle and homogenized for 10 minutes.

The mixture is degassed for 20 minutes at 280 RPM, heated at a rate of 1° C. per minute to 37° C. at 350 RPM for aggregation, until the particle size is 5.0 µm.

A shell mixture is separately formed and immediately added to the above aggregation, and allowed to further aggregate for another 10-20 minutes at 40° C., 350 rpm. The shell mixture contains 58.61 g of 56° C. Tg amorphous polyester resin emulsion (207 nm; 33.44 wt %), 57.23 g of 60.5° C. Tg amorphous polyester resin emulsion (215 nm; 34.25 wt %), 1.67 g of DOWFAX® 2A1 and 40.96 g of deionized water.

As long as the volume average particle diameter is above 5.7 µm, the pH of the aggregation slurry is adjusted to 4 by adding 4 wt % of NaOH solution, followed by adding 5.38 g EDTA. The rpm is adjusted to 170 to stop aggregation, and the pH of the toner slurry is maintained at pH 7.5 by continuously adding 4 wt % of NaOH solution until the temperature reaches 85° C. for coalescence. The toner has a final particle size of 5.80 µm, GSD v/n 1.20/1.25, and circularity of 0.960. The toner slurry is then cooled to room temperature, separated by sieving (20 µm), filtered, washed, and freeze dried.

Atomic force microscopy (AFM) and transmission electron microscopy (TEM) will show clearly show toner particles that no silver nanoparticles are present due to smooth morphology and lack of dark shadows which are indicative of silver nanoparticles. Themogravimetric analysis (TGA), in this case would show two main stages of weight loss. In stage one, from 0° C.-100° C., there would be an initial weight loss of 0.1 to 4% due to the evaporation of adsorbed water molecules on toner particles. A second and even third weight loss would be seen from further slow evaporation of absorbed water molecules (100° C.-450° C.) and organic moieties from polymer binder in toner (450° C.-1100° C.) which would total from 80 to 95% depending on silver content. On further heating up to 1300° C. no residual silver will be present.

While the invention has been illustrated respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function.

For example, with embodiments described herein EA particles with or without pigment can be formulated to contain silver nanoparticles which can be printed onto surfaces other than paper. For example, additional substrates on which such EA toner partices that include silver nanoparticles in a shell portion thereof can be printed onto include, but are not limited to, labels, clothing, security-documents (paper or otherwise), plastics, tin foil, and other textiles and the like.

Embodiments described herein can include a printable composite with humidity sensor abilities. For example, toner composition described herein can be printed in any pattern, array, etc. with precise control over the thickness of the coating or pattern. In one example, the sensor can be based on a polyvinyl alcohol (PVA) silver nanoparticle composite cast on an interdigital electrode array. On application of a constant potential (1V), a current can develop which is proportional to levels of humidity from 10% to 60%. Such a response is reversible and fast at room temperature, and it displays a high selectivity.

Additionally, a printable composite can include silver nanoparticles. Because silver nanoparticles can display a strong color shift from purple to yellow upon mixing with increasing concentration of ammonia ranging from 5 to 100 ppm, the toner containing Ag nanoparticles as described herein can be used as colorimetric assay for sensing applications of ammonia in water. In an example, such a toner can be incorporated on a printable dip stick. For example, a printable glucose stick can include silver nanoparticles printed via a toner of the embodiments. Accordingly, such non-functionalized silver nanoparticles in ethanol solution can be detected to provide a progressive shift of localized surface plasmon resonances caused by the adding of increasing quantities of glucose.

Like inkjet printing, xerographic printing of sensors formed, in part, by depositing silver nanoparticles-based toner according to an embodiment may offer advantages over deposition of thin films such as patterning capability, reduction in waste products, high speed production, low cost fabrication, lower temperature/solvent-free deposition, printing on large area, flexible substrates, and direct patterning of a substrate surface. Additionally, xerographic-type printing does not rely on the use of a specific mask, compared to the multistep process of photolithography. Accordingly, the manufacturer of sensors that include a step of printing a silver nanoparticles based toner according to an embodiment, can provide a benefit of printing any pattern required as well as providing control over the thickness at which the material is deposited onto substrate. By using associated printer software, a design template can be modified as needed, thereby eliminating the need for individually designed masks required for screen printing or the complex programming for some other deposition instruments To the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

REFERENCES

G. A. Sotiriou and S. E. Pratsinis, Engineering nanosilver as an antibacterial, biosensor and bioimaging material, Current Opinion in Chemical Engineering, 1:3-10 (2011).

What is claimed is:

1. A toner comprising a plurality of toner particles, each toner particle comprising:
    a binder resin core comprising at least one binder resin; and
    a shell disposed about the binder resin core, the shell comprising a plurality of metal nanoparticles and a shell matrix, the plurality of metal nanoparticles disposed in the shell matrix, wherein the shell matrix is formed of a resin having a higher Tg than a Tg of the core's resin,
    wherein each metal nanoparticle comprises at least one metal selected from the group consisting of gold (Au), palladium (Pd), iron (Fe), aluminum (Al), antimony (Sb), tungsten (W), terbium (Tb), dysprosium (Dy), gadolinium (Gd), europium (Eu), neodymium (Nd), praseodymium (Pr), strontium (Sr), magnesium (Mg), cobalt (Co), manganese (Mn), chromium (Cr), vanadium (V), molybdenum (Mo), zirconium (Zr), and barium (Ba), wherein the shell has a thickness of between 0.001 μm and about 0.2 μm, wherein the binder resin core comprises an amorphous polyester and a crystalline polyester, and wherein the binder resin core is prepared by a method comprising:

forming an aggregate of the binder resin in which metallic nanoparticles are not present.

2. The toner of claim 1, wherein the binder resin comprises at least one selected from the group consisting of styrene resins, acryl resins, vinyl resins, polyether polyol resins, phenol resins, silicon resins, polyester resins, epoxy resins, polyamide resins, polyurethane resins, and polybutadiene resins.

3. The toner of claim 1, wherein the shell further comprises silver (Ag) nanoparticles.

4. The toner of claim 1, wherein the toner particles comprise between about 0.00001 wt % and about 10 wt % metal nanoparticles by weight of the toner particles.

5. The toner of claim 1, wherein the binder resin core further comprises an additional resin, a wax, a coagulant, or a stabilizer.

6. The toner of claim 1, wherein the binder resin core consists essentially of the amorphous polyester and the crystalline polyester, a wax, a coagulant, and a stabilizer.

7. The toner of claim 1, wherein the binder resin core does not comprise metal nanoparticles.

8. A toner comprising a plurality of toner particles, each toner particle comprising:

a binder resin core comprising at least one binder resin; and a shell disposed about the binder resin core, the shell comprising a plurality of metal nanoparticles and a shell matrix, the plurality of metal nanoparticles disposed in the shell matrix, wherein the shell matrix is formed of a resin having a higher Tg than a Tg of the core's resin, wherein each metal nanoparticle comprises at least one metal selected from the group consisting of gold (Au), palladium (Pd), iron (Fe), aluminum (Al), antimony (Sb), tungsten (W), terbium (Tb), dysprosium (Dy), gadolinium (Gd), europium (Eu), neodymium (Nd), praseodymium (Pr), strontium (Sr), magnesium (Mg), cobalt (Co), manganese (Mn), chromium (Cr), vanadium (V), molybdenum (Mo), zirconium (Zr), and barium (Ba), wherein the binder resin core does not comprise metal nanoparticles, and wherein the binder resin core is prepared by a method comprising:

forming an aggregate of the binder resin in which metallic nanoparticles are not present, wherein the shell has a thickness of between 0.001 μm and 0.5 μm, and wherein the binder resin core consists essentially of a binder resin and an additional resin, a wax, a coagulant, and a stabilizer.

9. The toner of claim 8, wherein the shell further comprises silver (Ag) nanoparticles.

* * * * *